(12) United States Patent
Yu et al.

(10) Patent No.: US 12,647,565 B2
(45) Date of Patent: Jun. 2, 2026

(54) QUANTIZATION LEVEL BINARIZATION IN VIDEO CODING

(71) Applicant: GUANGDONG OPPO MOBILE TELECOMMUNICATIONS CORP., LTD., Dongguan (CN)

(72) Inventors: Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 43 days.

(21) Appl. No.: 18/566,062

(22) PCT Filed: Jun. 1, 2022

(86) PCT No.: PCT/US2022/031838
§ 371 (c)(1),
(2) Date: Nov. 30, 2023

(87) PCT Pub. No.: WO2022/256451
PCT Pub. Date: Dec. 8, 2022

(65) Prior Publication Data
US 2024/0297997 A1     Sep. 5, 2024

Related U.S. Application Data

(60) Provisional application No. 63/196,618, filed on Jun. 3, 2021.

(51) Int. Cl.
*H04N 19/124* (2014.01)
*H04N 19/14* (2014.01)
*H04N 19/18* (2014.01)

(52) U.S. Cl.
CPC ........... *H04N 19/124* (2014.11); *H04N 19/14* (2014.11); *H04N 19/18* (2014.11)

(58) Field of Classification Search
CPC ....... H04N 19/124; H04N 19/14; H04N 19/18
(Continued)

(56) References Cited

U.S. PATENT DOCUMENTS

| | | | | |
|---|---|---|---|---|
| 2013/0300591 A1* | 11/2013 | Marpe | ..................... | H03M 7/00 |
| | | | | 341/67 |
| 2015/0016537 A1* | 1/2015 | Karczewicz | ......... | H04N 19/176 |
| | | | | 375/240.18 |

(Continued)

OTHER PUBLICATIONS

WIPO, International Search Report and Written Opinion for International Application No. PCT/US2022/031838, Oct. 11, 2022.

(Continued)

*Primary Examiner* — Jayanti K Patel
*Assistant Examiner* — Richard B Carter
(74) *Attorney, Agent, or Firm* — Hodgson Russ LLP

(57)     ABSTRACT

A method for encoding a picture of a video including a current transform unit is disclosed. A coefficient of each position in the current transform unit is quantized by a processor to generate quantization levels of the current transform unit. A value of a Rice parameter of a current position in the current transform unit for Golomb-Rice binarization is determined by the processor based on a value of a history variable for a previous transform unit preceding the current transform unit. The value of the history variable is determined based on at least one of a bit depth or a bit rate for encoding the picture. The quantization level of the current position is converted by the processor into a binary representation using Golomb-Rice binarization with the value of the Rice parameter. The binary representation of the current position is compressed by the processor into a bitstream.

20 Claims, 15 Drawing Sheets

(58) Field of Classification Search
 USPC ........................... 375/240.02, 240.18; 341/67
 See application file for complete search history.

(56) References Cited

U.S. PATENT DOCUMENTS

| | | | |
|---|---|---|---|
| 2017/0034511 A1 | 2/2017 | Yamazaki et al. | |
| 2017/0214940 A1 | 7/2017 | Chien et al. | |
| 2020/0260080 A1 | 8/2020 | Choi et al. | |
| 2022/0191529 A1* | 6/2022 | Rusanovskyy | H04N 19/176 |
| 2022/0337812 A1* | 10/2022 | Rusanovskyy | H04N 19/174 |

OTHER PUBLICATIONS

Bross et al., "Versatile Video Coding Editorial Refinements on Draft 10," Joint Video Experts Team (JVET) of ITU-T SG 16 WP 3 and ISO/IEC JTC 1/SC 29, JVET-T2001-v2, Oct. 2020.

"Series H: Audiovisual and Multimedia Systems; Infrastructure of audiovisual services—Coding of moving video: High efficiency video coding," Telecommunication Standardization Sector of ITU (ITU-T), H.265, Jun. 2019.

Wang et al., "AHG8: a full-bypass mode in residual coding for high bit depth and high bit rate extensions," Joint Video Experts Team (JVET) of ITU-T SG 16 WP 3 and ISO/IEC JTC 1/SC 29, JVET-V0122-v1, Apr. 2021.

Sarwer et al., "AHG8: CABAC-bypass alignment for high bit-depth coding," Joint Video Experts Team (JVET) of ITU-T SG 16 WP 3 and ISO/IEC JTC 1/SC 29, JVET-V0059-v1, Apr. 2021.

Wang et al., "AHG8: a combination of JVET-V0059 option 2 and JVET-V0122 for high bit depth and high bit rate extensions," Joint Video Experts Team (JVET) of ITU-T SG 16 WP 3 and ISO/IEC JTC 1/SC 29, JVET-V0178-v1, Apr. 2021.

Rusanovskyy et al., "CE-related: On history-enhanced method of Rice parameter derivation for regular residual coding (RRC) at high bit depths," Joint Video Experts Team (JVET) of ITU-T SG 16 WP 3 and ISO/IEC JTC 1/SC 29, JVET-V0106, Apr. 2021.

Browne et al., "CE: Summary Report on Entropy Coding for High Bit Depth and High Bit Rate Coding," Joint Video Experts Team (JVET) of ITU-T SG 16 WP 3 and ISO/IEC JTC 1/SC 29, JVET-V0022, Apr. 2021.

Rusanovskyy et al., "CE-1.1 and CE-1.2: On the Rice parameter derivation for high bit-depth coding," Joint Video Experts Team (JVET) of ITU-T SG 16 WP 3 and ISO/IEC JTC 1/SC 29, Document: JVET-U0064, Jan. 2021.

Rusanovskyy et al., "CE Related: On signaling and encoder optimization for Rice parameter derivation," Joint Video Experts Team (JVET) of ITU-T SG 16 WP 3 and ISO/IEC JTC 1/SC 29, Document: JVET-U0070, Jan. 2021.

EPO, Extended European Search Report for EP Application No. 22816801.9, Mar. 28, 2025.

CNIPA, First Office Action for CN Application No. 202411948814. 8, Oct. 31, 2025.

Browne et al., "Algorithm description for Versatile Video Coding and Test Model 15 (VTM15)," Joint Video Experts Team (JVET) of ITU-T SG 16 WP 3 and ISO/IEC JTC 1/SC 29, Document: JVET-X2002-v1, Oct. 2021.

CNIPA, Second Office Action for CN Application No. 202411948814. 8, Jan. 9, 2026.

* cited by examiner

100

200

201

500

502

| INPUT VALUE | CODEWORD PREFIX | CODEWORD SUFFIX | PREFIX CODE LENGTH | SUFFIX LENGTH | TOTAL CODEWORD LENGTH |
|---|---|---|---|---|---|
| [0, 3] | 0 | XX | 1 | 2 | 3 |
| [4, 7] | 10 | XX | 2 | 2 | 4 |
| [8, 11] | 110 | XX | 3 | 2 | 5 |
| [12, 15] | 1110 | XX | 4 | 2 | 6 |
| [16, 23] | 11110 | XXX | 5 | 3 | 8 |
| [24, 39] | 111110 | XXXX | 6 | 4 | 10 |
| [40, 71] | 1111110 | XXXXX | 7 | 5 | 12 |
| [72, 135] | 11111110 | XXXXXX | 8 | 6 | 14 |
| [136, 263] | 111111110 | XXXXXXX | 9 | 7 | 16 |
| [264, 519] | 1111111110 | XXXXXXXX | 10 | 8 | 18 |
| [520, 4194823] | 1111111111 | XXX ... 22 TIMES | 10 | 22 | 32 |

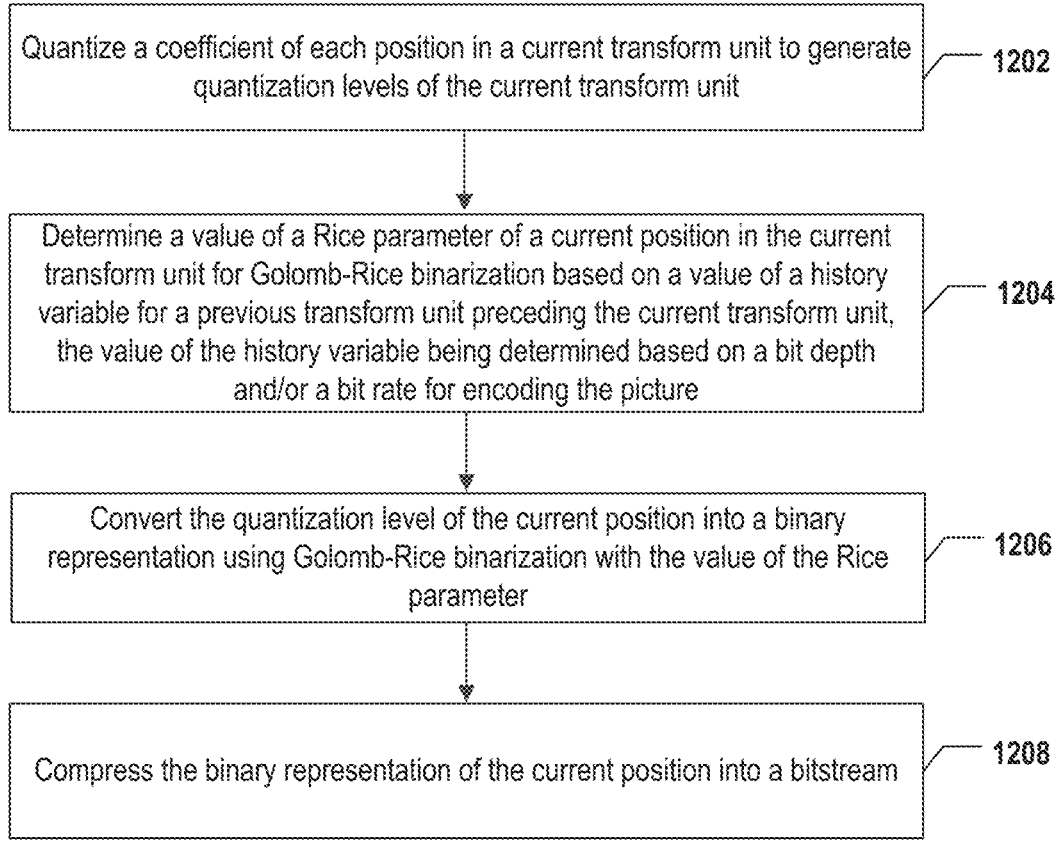

Quantize a coefficient of each position in a current transform unit to generate quantization levels of the current transform unit — 1202

Determine a value of a Rice parameter of a current position in the current transform unit for Golomb-Rice binarization based on a value of a history variable for a previous transform unit preceding the current transform unit, the value of the history variable being determined based on a bit depth and/or a bit rate for encoding the picture — 1204

Convert the quantization level of the current position into a binary representation using Golomb-Rice binarization with the value of the Rice parameter — 1206

Compress the binary representation of the current position into a bitstream — 1208

FIG. 12

Obtain a value of an offset based on the bit depth and/or the bit rate for encoding the picture — 1302

Determine the value of the history variable based on the value of the offset and a first, non-zero, Golomb-Rice coded quantization level of the quantization levels of the previous transform unit — 1304

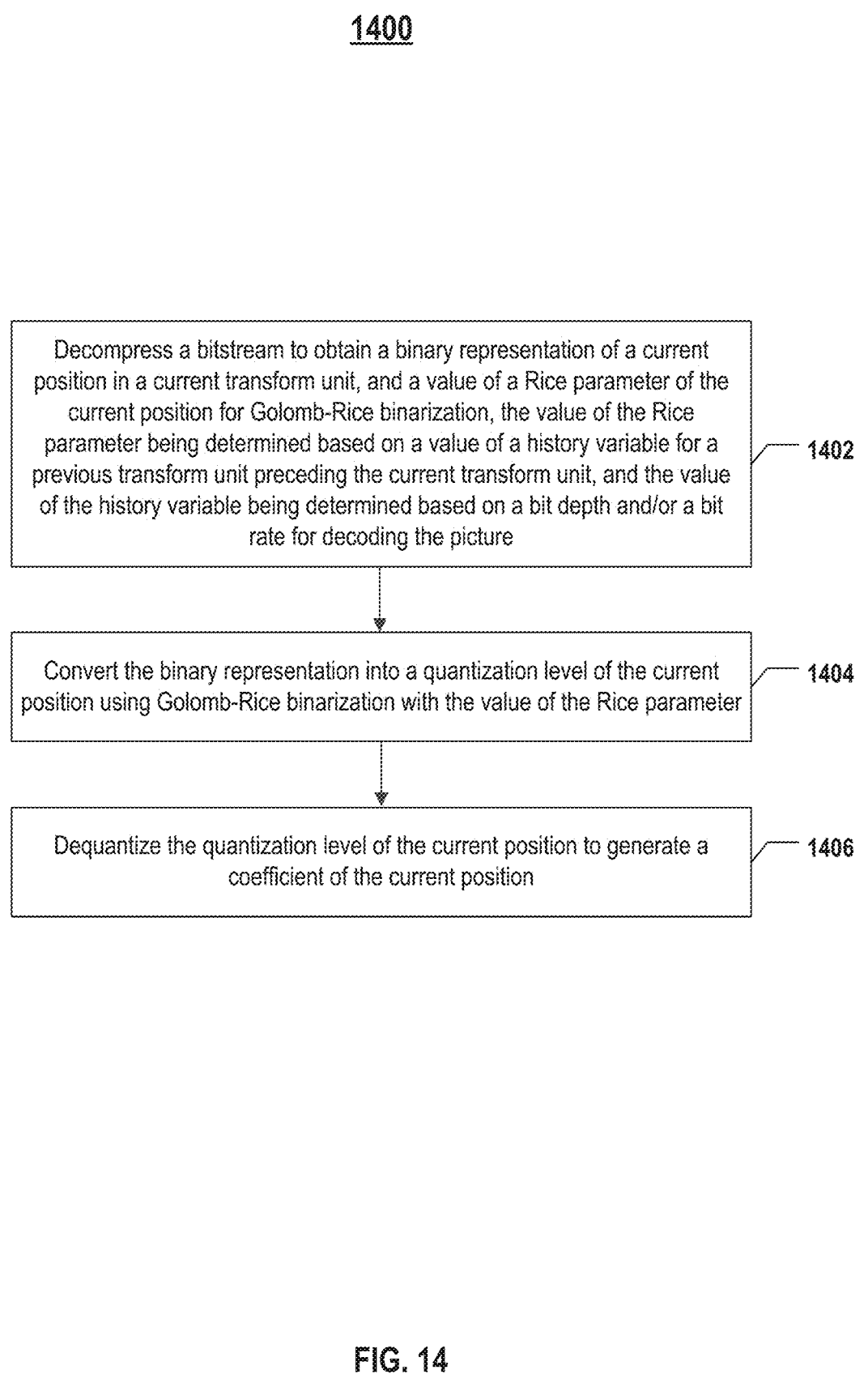

1400

```
┌─────────────────────────────────────────────────────────────┐
│ Decompress a bitstream to obtain a binary representation of a  │
│ current position in a current transform unit, and a value of a │
│ Rice parameter of the current position for Golomb-Rice         │
│ binarization, the value of the Rice parameter being determined │──── 1402
│ based on a value of a history variable for a previous transform│
│ unit preceding the current transform unit, and the value of the│
│ history variable being determined based on a bit depth and/or a│
│ bit rate for decoding the picture                              │
└─────────────────────────────────────────────────────────────┘
                              │
                              ▼
┌─────────────────────────────────────────────────────────────┐
│ Convert the binary representation into a quantization level of │──── 1404
│ the current position using Golomb-Rice binarization with the   │
│ value of the Rice parameter                                    │
└─────────────────────────────────────────────────────────────┘
                              │
                              ▼
┌─────────────────────────────────────────────────────────────┐
│ Dequantize the quantization level of the current position to   │──── 1406
│ generate a coefficient of the current position                 │
└─────────────────────────────────────────────────────────────┘
```

FIG. 14

QUANTIZATION LEVEL BINARIZATION IN VIDEO CODING

CROSS-REFERENCE TO RELATED APPLICATIONS

This application is a U.S. national stage entry of International Application No. PCT/US2022/031838, filed Jun. 1, 2022, which claims the benefit of priority to U.S. Provisional Application No. 63/196,618, filed Jun. 3, 2021, the entire disclosures of which are incorporated by reference herein.

BACKGROUND

Embodiments of the present disclosure relate to video coding.

Digital video has become mainstream and is being used in a wide range of applications including digital television, video telephony, and teleconferencing. These digital video applications are feasible because of the advances in computing and communication technologies as well as efficient video coding techniques. Various video coding techniques may be used to compress video data, such that coding on the video data can be performed using one or more video coding standards. Exemplary video coding standards may include, but not limited to, versatile video coding (H.266/VVC), high-efficiency video coding (H.265/HEVC), advanced video coding (H.264/AVC), moving picture expert group (MPEG) coding, to name a few.

SUMMARY

According to one aspect of the present disclosure, a method for encoding a picture of a video including a current transform unit is disclosed. A coefficient of each position in the current transform unit is quantized by a processor to generate quantization levels of the current transform unit. A value of a Rice parameter of a current position in the current transform unit for Golomb-Rice binarization is determined by the processor based on a value of a history variable for a previous transform unit preceding the current transform unit. The value of the history variable is determined based on at least one of a bit depth or a bit rate for encoding the picture. The quantization level of the current position is converted by the processor into a binary representation using Golomb-Rice binarization with the value of the Rice parameter. The binary representation of the current position is compressed by the processor into a bitstream.

According to another aspect of the present disclosure, a method for decoding a picture of a video including a current transform unit is disclosed. A bitstream is decompressed by a processor to obtain a binary representation of a current position in the current transform unit, and a value of a Rice parameter of the current position for Golomb-Rice binarization is obtained. The value of the Rice parameter is determined based on a value of a history variable for a previous transform unit preceding the current transform unit. The value of the history variable is determined based on at least one of a bit depth or a bit rate for decoding the picture. The binary representation is converted by the processor into a quantization level of the current position using Golomb-Rice binarization with the value of the Rice parameter. The quantization level of the current position is dequantized by the processor to generate a coefficient of the current position.

According to another aspect of the present disclosure, a system for decoding a picture of a video including a current transform unit includes a memory configured to store instructions and a processor coupled to the memory. The processor is configured to, upon executing the instructions, decompress a bitstream to obtain a binary representation of a current position in the current transform unit, and a value of a Rice parameter of the current position for Golomb-Rice binarization. The value of the Rice parameter is determined based on a value of a history variable for a previous transform unit preceding the current transform unit. The value of the history variable is determined based on at least one of a bit depth or a bit rate for decoding the picture. The processor is also configured to, upon executing the instructions, convert the binary representation into a quantization level of the current position using Golomb-Rice binarization with the value of the Rice parameter. The processor is further configured to, upon executing the instructions, dequantize the quantization level of the current position to generate a coefficient of the current position.

These illustrative embodiments are mentioned not to limit or define the present disclosure, but to provide examples to aid understanding thereof. Additional embodiments are described in the Detailed Description, and further description is provided there.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 8 illustrates exemplary codewords used in Golomb-Rice binarization of an input level, according to some embodiments of the present disclosure.

FIG. 12 illustrates a flow chart of an exemplary method of video encoding, according to some embodiments of the present disclosure.

FIG. 14 illustrates a flow chart of an exemplary method of video decoding, according to some embodiments of the present disclosure.

Figure 1:
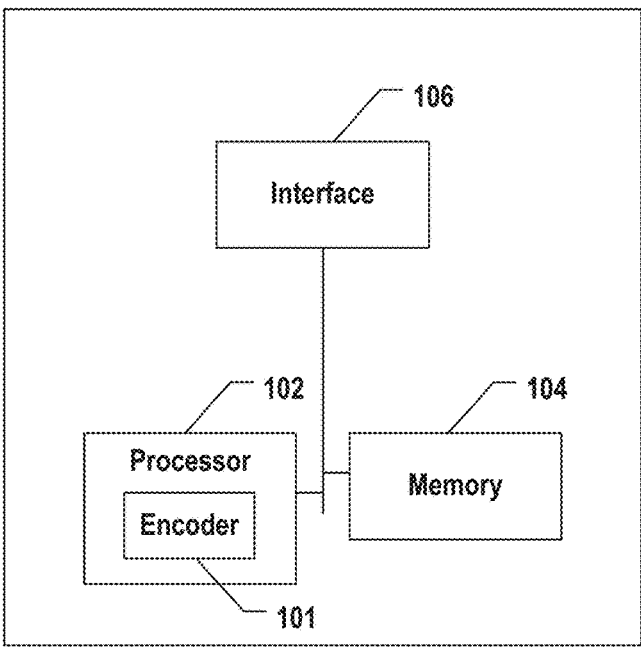
FIG. 1 illustrates a block diagram of an exemplary encoding system, according to some embodiments of the present disclosure.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of video coding systems will now be described with reference to various apparatus and methods. These apparatus and methods will be described in the following detailed description and illustrated in the accompanying drawings by various modules, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various video coding applications. As described herein, video coding includes both encoding and decoding a video. Encoding and decoding of a video can be performed by the unit of block. For example, an encoding/decoding process such as transform, quantization, prediction, in-loop filtering, reconstruction, or the like may be performed on a coding block, a transform block, or a prediction block. As described herein, a block to be encoded/decoded will be referred to as a "current block." For example, the current block may represent a coding block, a transform block, or a prediction block according to a current encoding/decoding process. In addition, it is understood that the term "unit" used in the present disclosure indicates a basic unit for performing a specific encoding/decoding process, and the term "block" indicates a sample array of a predetermined size. Unless otherwise stated, the "block" and "unit" may be used interchangeably.

In video coding, quantization is used to reduce the dynamic range of transformed or non-transformed video signals so that fewer bits will be used to represent video signals. Before quantization, the transformed or non-transformed video signal at a specific position is referred to as a "coefficient." After quantization, the quantized value of the coefficient is referred to as a "quantization level" or "level." In the present disclosure, a quantization level of a position refers to the quantization level of a coefficient at the position. Residual coding is used to encode the quantization levels of positions into a bitstream in video coding. After quantization, there are N×M quantization levels for an N×M coding block. These N×M quantization levels may be zero or non-zero values. The non-zero levels will further be converted (e.g., binarized) to a binary representation (e.g., binary bins) using binarization methods if the levels are not binary. The binary representation (e.g., binary bins) will then be compressed into the bitstream using coding algorithms (e.g., entropy coding algorithms). Examples of the binarization methods include, but are not limited to, Golomb-Rice binarization, such as combined truncated Rice (TR) and limited k-th order Exp-Golomb (EGk) binarization and k-th order Exp-Golomb binarization. Examples of the entropy encoding algorithms include, but are not limited to, a variable-length coding (VLC) scheme, a context-adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding, or other entropy encoding techniques.

For example, combined TR and limited EGk binarization for H.266/VVC uses a number of parameters such as a cutoff parameter, a Rice parameter, and a length of dynamic range (LDR) of coefficient. The Rice parameter specifies the initial suffix code length: the cutoff parameter is used to specify the number of input value ranges that can use the initial suffix code length: the LDR is used to define the maximum suffix code length. For high bit depth and high bit rate video coding (e.g., the bit depth equal to 16 bits), the quantization levels to be binarized are much larger on average than that in the current H.266/VVC (e.g., the bit depth lower than 16 bits, e.g., 10 bits). As such, for high bit depth and high bit rate video coding, the current parameters used to binarize the quantization levels, such as the Rice parameter, may not be optimal, and the coding performance with the current H.266/VVC may be compromised.

To improve the coding performance of video coding, in particular, high bit depth and high bit rate video coding, the present disclosure provides a scheme of quantization level binarization with Rice parameter adapted to the bit depth and the bit rate for encoding the picture of the video. In some embodiments, the value of the Rice parameter of a current position in the current transform unit for Golomb-Rice binarization is determined based on the value of a history variable for a previous transform unit preceding the current transform unit, and the value of the history variable is determined based on the bit depth and/or the bit rate for encoding the picture. For example, an offset (e.g., a non-zero integer) may be used to adjust the value of the history variable based on the bit depth and/or the bit rate for encoding the picture. For high bit depth and high bit rate video coding, the value of the offset may be larger compared to low bit depth and low bit rate or normal bit depth and normal bit rate video coding, to become more suitable for larger quantization levels in average. As a result, the Rice parameter (e.g., the codeword length) can be optimized based on the bit depth and/or the bit rate, thereby improving the coding efficiency.

According to some aspects of the present disclosure, the scheme of quantization level binarization disclosed herein can be applied to bypass coding modes, particularly the bypass coding mode in regular residual coding (RRC).

For example, CABAC for H.266/VVC, H.265/HEVC, and H.264/AVC use bins to code quantization levels of positions into bits. There are two kinds of context modeling-based coding approaches used by CABAC. The context-based approach updates the context model adaptively according to the neighboring coded information; bins coded in this way are called context-coded bins (CCBs). In contrast, the other bypass approach assumes the probability of 1 or 0) is always 50% and therefore always uses a fixed context modeling without adaptation: bins coded by this approach are called bypass-coded bins (BCBs).

For high bit depth and high bit rate video coding, the throughput becomes a more serious issue. The coding using context-coded bins, however, requires relatively complex hardware implementations and reduces the throughput of video coding in general, compared with coding bypass-coded bins and thus, has become a bottleneck for improving the throughput of high bit-depth and high bit-rate video coding.

To improve the throughput of video coding, in particular, high bit depth and high bit rate video coding, the bypass coding mode in which the context-coded bins for residual coding (e.g., binarized from the remaining levels of quantization levels) can be skipped or changed to bypass-coded bins. In other words, only bypass-coded bins (e.g., binarized from the absolute levels of quantization levels) may be used in the bypass coding mode in RRC. However, the current H.266/VVC does not apply a bit depth and/or bit rate-based offset in calculating the value of the history variable for determining the Rice parameter in the bypass modes in RRC.

According to some aspects of the present disclosure, the scheme of quantization level binarization with Rice parameter adapted to the bit depth and/or the bit rate for encoding the picture of the video can be applied to the bypass coding mode in RRC as well. In some embodiments, the binary representation of the current position includes a bypass-coded bin in RRC. For example, the bypass-coded bins from the absolute levels of quantization levels may also be converted using Golomb-Rice binarization with the value of the Rice parameter that is adapted to the bit depth and/or the bit rate for encoding the picture of the video. Thus, both the coding efficiency and throughput can be improved in bypass modes in RRC for high bit depth and high bit rate video coding.

Figure 2:
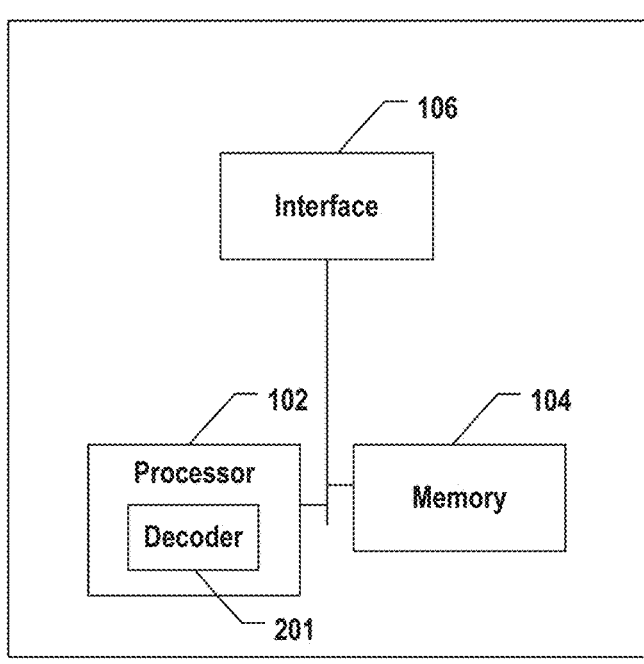
FIG. 2 illustrates a block diagram of an exemplary decoding system, according to some embodiments of the present disclosure.

FIG. 1 illustrates a block diagram of an exemplary encoding system 100, according to some embodiments of the present disclosure. FIG. 2 illustrates a block diagram of an exemplary decoding system 200, according to some embodiments of the present disclosure. Each system 100 or 200 may be applied or integrated into various systems and apparatus capable of data processing, such as computers and wireless communication devices. For example, system 100 or 200 may be the entirety or part of a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having data processing capability. As shown in FIGS. 1 and 2, system 100 or 200 may include a processor 102, a memory 104, and an interface 106. These components are shown as connected to one another by a bus, but other connection types are also permitted. It is understood that system 100 or 200 may include any other suitable components for performing functions described here.

Processor 102 may include microprocessors, such as graphic processing unit (GPU), image signal processor (ISP), central processing unit (CPU), digital signal processor (DSP), tensor processing unit (TPU), vision processing unit (VPU), neural processing unit (NPU), synergistic processing unit (SPU), or physics processing unit (PPU), microcontroller units (MCUs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Although only one processor is shown in FIGS. 1 and 2, it is understood that multiple processors can be included. Processor 102 may be a hardware device having one or more processing cores. Processor 102 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

Memory 104 can broadly include both memory (a.k.a, primary/system memory) and storage (a.k.a., secondary memory). For example, memory 104 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 102. Broadly, memory 104 may be embodied by any computer-readable medium, such as a non-transitory computer-readable medium. Although only one memory is shown in FIGS. 1 and 2, it is understood that multiple memories can be included.

Interface 106 can broadly include a data interface and a communication interface that is configured to receive and transmit a signal in a process of receiving and transmitting information with other external network elements. For example, interface 106 may include input/output (I/O) devices and wired or wireless transceivers. Although only one memory is shown in FIGS. 1 and 2, it is understood that multiple interfaces can be included.

Processor 102, memory 104, and interface 106 may be implemented in various forms in system 100 or 200 for performing video coding functions. In some embodiments, processor 102, memory 104, and interface 106 of system 100 or 200 are implemented (e.g., integrated) on one or more system-on-chips (SoCs). In one example, processor 102, memory 104, and interface 106 may be integrated on an application processor (AP) SoC that handles application processing in an operating system (OS) environment, including running video encoding and decoding applications. In another example, processor 102, memory 104, and interface 106 may be integrated on a specialized processor chip for video coding, such as a GPU or ISP chip dedicated to image and video processing in a real-time operating system (RTOS).

As shown in FIG. 1, in encoding system 100, processor 102 may include one or more modules, such as an encoder 101. Although FIG. 1 shows that encoder 101 is within one processor 102, it is understood that encoder 101 may include one or more sub-modules that can be implemented on different processors located closely or remotely with each other. Encoder 101 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to video encoding, such as picture partitioning, inter prediction, intra prediction, transformation, quantization, filtering, entropy encoding, etc., as described below in detail.

Similarly, as shown in FIG. 2, in decoding system 200, processor 102 may include one or more modules, such as a decoder 201. Although FIG. 2 shows that decoder 201 is within one processor 102, it is understood that decoder 201 may include one or more sub-modules that can be implemented on different processors located closely or remotely with each other. Decoder 201 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to video decoding, such as entropy decoding, inverse quantization, inverse transformation, inter prediction, intra prediction, filtering, as described below in detail.

Figure 3:
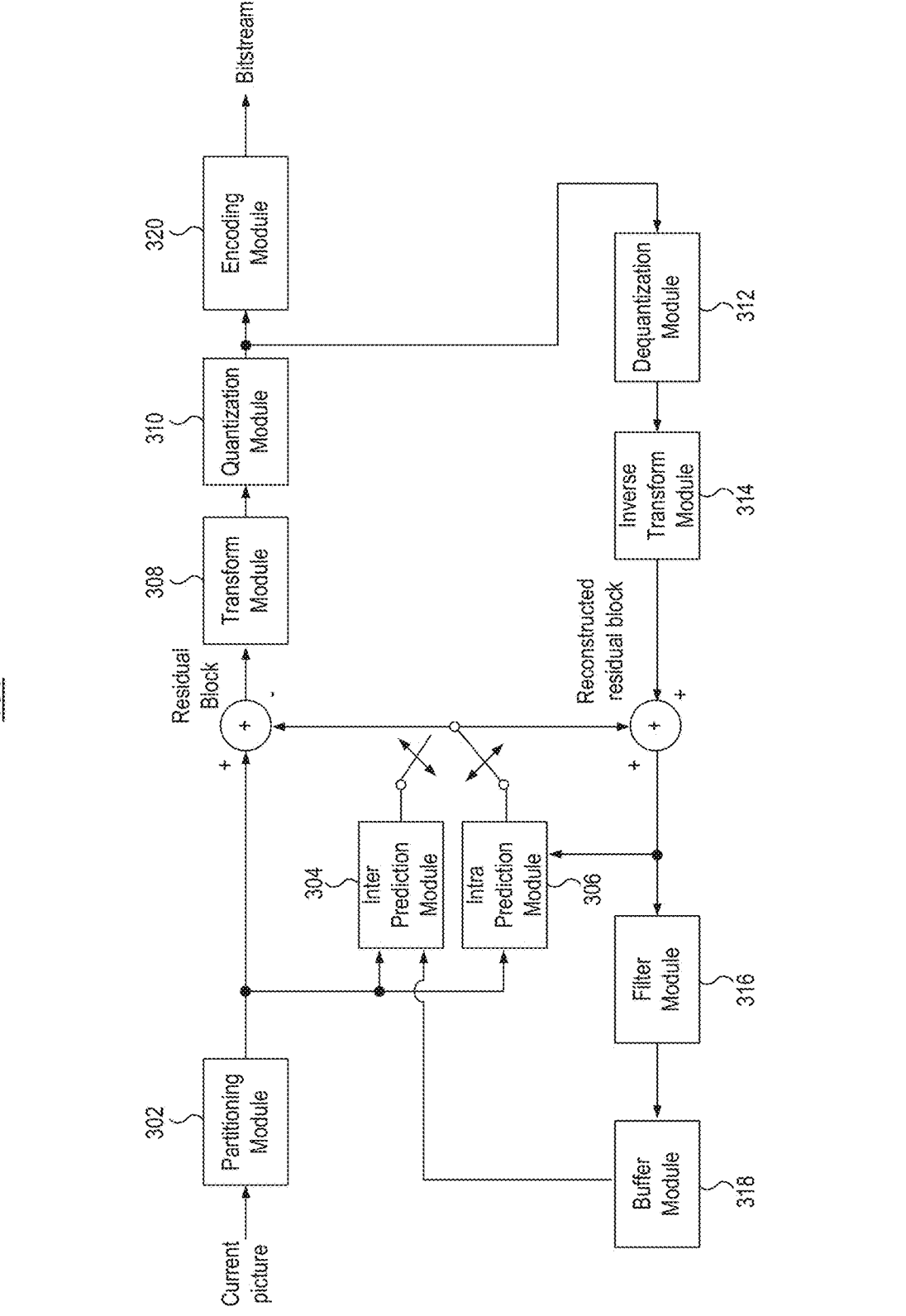
FIG. 3 illustrates a detailed block diagram of an exemplary encoder in the encoding system in FIG. 1, according to some embodiments of the present disclosure.

FIG. 3 illustrates a detailed block diagram of exemplary encoder 101 in encoding system 100 in FIG. 1, according to some embodiments of the present disclosure. As shown in FIG. 3, encoder 101 may include a partitioning module 302, an inter prediction module 304, an intra prediction module

306, a transform module 308, a quantization module 310, a dequantization module 312, an inverse transform module 314, a filter module 316, a buffer module 318, and an encoding module 320. It is understood that each of the elements shown in FIG. 3 is independently shown to represent characteristic functions different from each other in a video encoder, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on encoder 101.

Partitioning module 302 may be configured to partition an input picture of a video into at least one processing unit. A picture can be a frame of the video or a field of the video. In some embodiments, a picture includes an array of luma samples in monochrome format, or an array of luma samples and two corresponding arrays of chroma samples. At this point, the processing unit may be a prediction unit (PU), a transform unit (TU), or a coding unit (CU). Partitioning module 302 may partition a picture into a combination of a plurality of coding units, prediction units, and transform units, and encode a picture by selecting a combination of a coding unit, a prediction unit, and a transform unit based on a predetermined criterion (e.g., a cost function).

Figure 5:
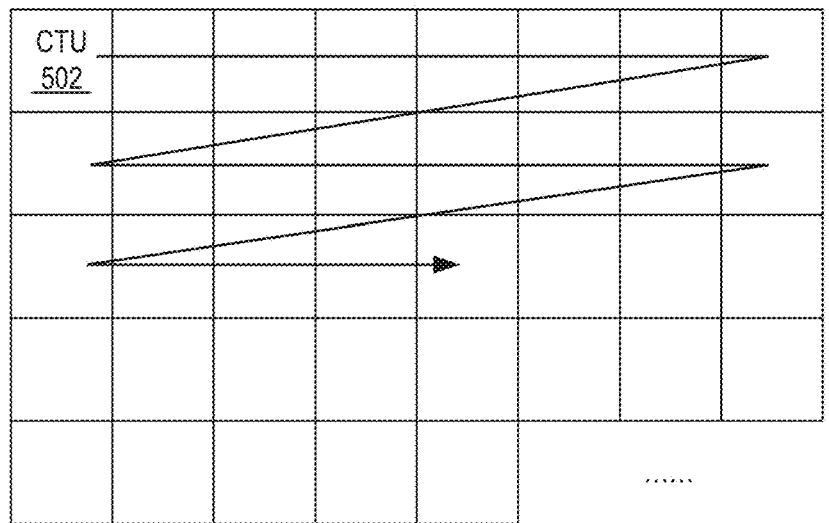
FIG. 5 illustrates an exemplary picture divided into coding tree units (CTUs), according to some embodiments of the present disclosure.
Figure 6:
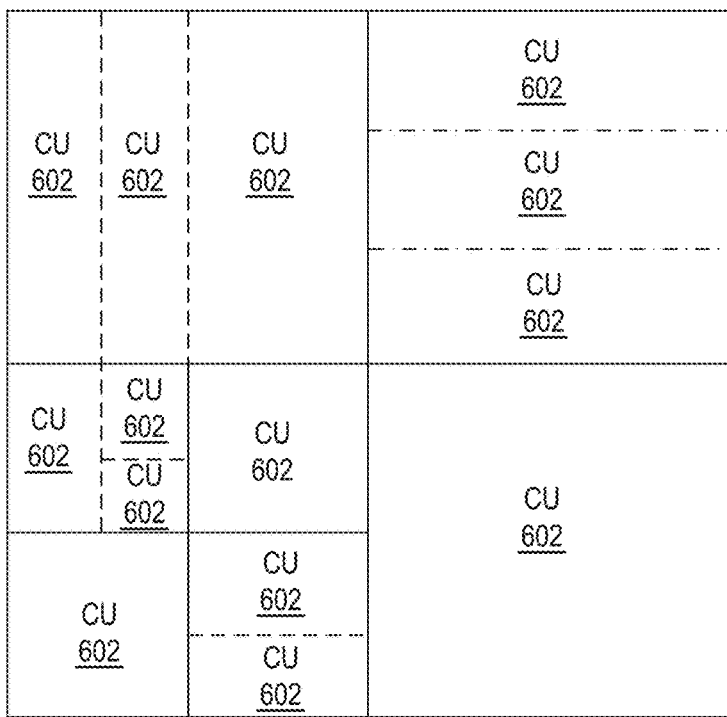
FIG. 6 illustrates an exemplary CTU divided into coding units (CUs), according to some embodiments of the present disclosure.

Similar to H.265/HEVC. H.266/VVC is a block-based hybrid spatial and temporal predictive coding scheme. As shown in FIG. 5, during encoding, an input picture 500 is first divided into square blocks-CTUs 502, by partitioning module 302. For example, CTUs 502 can be blocks of 128×128 pixels. As shown in FIG. 6, each CTU 502 in picture 500 can be partitioned by partitioning module 302 into one or more CUs 602, which can be used for prediction and transformation. Unlike H.265/HEVC, in H.266/VVC. CUs 602 can be rectangular or square, and can be coded without further partitioning into prediction units or transform units. For example, as shown in FIG. 6, the partition of CTU 502 into CUs 602 may include quadtree splitting (indicated in solid lines), binary tree splitting (indicated in dashed lines), and ternary splitting (indicated in dash-dotted lines). Each CU 602 can be as large as its root CTU 502 or be subdivisions of root CTU 502 as small as 4×4 blocks, according to some embodiments.

Referring to FIG. 3, inter prediction module 304 may be configured to perform inter prediction on a prediction unit, and intra prediction module 306 may be configured to perform intra prediction on the prediction unit. It may be determined whether to use inter prediction or to perform intra prediction for the prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. Residual coefficients in a residual block between the generated prediction block and the original block may be input into transform module 308. In addition, prediction mode information, motion vector information, and the like used for prediction may be encoded by encoding module 320 together with the residual coefficients or quantization levels into the bitstream. It is understood that in certain encoding modes, an original block may be encoded as it is without generating a prediction block through prediction module 304 or 306. It is also understood that in certain encoding modes, prediction, transform, and/or quantization may be skipped as well.

In some embodiments, inter prediction module 304 may predict a prediction unit based on information on at least one picture among pictures before or after the current picture, and in some cases, it may predict a prediction unit based on information on a partial area that has been encoded in the current picture. Inter prediction module 304 may include sub-modules, such as a reference picture interpolation module, a motion prediction module, and a motion compensation module (not shown). For example, the reference picture interpolation module may receive reference picture information from buffer module 318 and generate pixel information of an integer number of pixels or less from the reference picture. In the case of a luminance pixel, a discrete cosine transform (DCT)-based 8-tap interpolation filter with a varying filter coefficient may be used to generate pixel information of an integer number of pixels or less by the unit of ¼ pixels. In the case of a color difference signal, a DCT-based 4-tap interpolation filter with a varying filter coefficient may be used to generate pixel information of an integer number of pixels or less by the unit of ⅛ pixels. The motion prediction module may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½, ¼, or 1/16 pixels or integer pel based on interpolated pixels. The motion prediction module may predict a current prediction unit by varying the motion prediction method. Various methods such as a skip method, a merge method, an advanced motion vector prediction (AMVP) method, an intra-block copy method, and the like may be used as the motion prediction method.

In some embodiments, intra prediction module 306 may generate a prediction unit based on the information on reference pixels around the current block, which is pixel information in the current picture. When a block in the neighborhood of the current prediction unit is a block on which inter prediction has been performed and thus, the reference pixel is a pixel on which inter prediction has been performed, the reference pixel included in the block on which inter prediction has been performed may be used in place of reference pixel information of a block in the neighborhood on which intra prediction has been performed. That is, when a reference pixel is unavailable, at least one reference pixel among available reference pixels may be used in place of unavailable reference pixel information. In the intra prediction, the prediction mode may have an angular prediction mode that uses reference pixel information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information. If the size of the prediction unit is the same as the size of the transform unit when intra prediction is performed, the intra prediction may be performed for the prediction unit based on pixels on the left side, pixels on the top-left side, and pixels on the top of the prediction unit. However, if the size of the prediction unit is different from the size of the transform unit when the intra prediction is performed, the intra prediction may be performed using a reference pixel based on the transform unit.

The intra prediction method may generate a prediction block after applying an adaptive intra smoothing (AIS) filter to the reference pixel according to a prediction mode. The type of the AIS filter applied to the reference pixel may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by extra flags information.

As shown in FIG. 3, a residual block including a prediction unit that has performed prediction based on the prediction unit generated by prediction module 304 or 306 and residual coefficient information, which is a difference value of the prediction unit with the original block, may be generated. The generated residual block may be input into transform module 308.

Transform module 308 may be configured to transform the residual block including the original block and the residual coefficient information of the prediction unit generated through prediction modules 304 and 306 using a transform method, such as DCT, discrete sine transform (DST), Karhunen-Loève transform (KLT), or transform skip. Whether to apply the DCT, the DST, or the KLT to transform the residual block may be determined based on intra prediction mode information of a prediction unit used to generate the residual block. Transform module 308 can transform the video signals in the residual block from the pixel domain to a transform domain (e.g., a frequency domain depending on the transform method). It is understood that in some examples, transform module 308 may be skipped, and the video signals may not be transformed to the transform domain.

Quantization module 310 may be configured to quantize the coefficient of each position in the coding block to generate quantization levels of the positions. The current block may be the residual block. That is, quantization module 310 can perform a quantization process on each residual block. The residual block may include N×M positions (samples) each associated with a transformed or non-transformed video signal/data, such as luma and/or chroma information, where N and M are positive integers. In the present disclosure, before quantization, the transformed or non-transformed video signal at a specific position is referred to herein as a "coefficient." After quantization, the quantized value of the coefficient is referred to herein as a "quantization level" or "level."

Quantization can be used to reduce the dynamic range of transformed or non-transformed video signals so that fewer bits will be used to represent video signals. Quantization typically involves division by a quantization step size and subsequent rounding, while dequantization (a.k.a., inverse quantization) involves multiplication by the quantization step size. The quantization step size can be indicated by a quantization parameter (QP). Such a quantization process is referred to as scalar quantization. The quantization of all coefficients within a coding block can be done independently, and this kind of quantization method is used in some existing video compression standards, such as H.264/AVC and H.265/HEVC. The QP in quantization can affect the bit rate used for encoding/decoding the pictures of the video. For example, a higher QP can result in a lower bit rate, and a lower QP can result in a higher bit rate.

For an N×M coding block, a specific coding scan order may be used to convert the two-dimensional (2D) coefficients of a block into a one-dimensional (1D) order for coefficient quantization and coding. Typically, the coding scan starts from the left-top corner and stops at the right-bottom corner of a coding block or the last non-zero coefficient/level in a right-bottom direction. It is understood that the coding scan order may include any suitable order, such as a zig-zag scan order, a vertical (column) scan order, a horizontal (row) scan order, a diagonal scan order, or any combinations thereof. Quantization of a coefficient within a coding block may make use of the coding scan order information. For example, it may depend on the status of the previous quantization level along the coding scan order. In order to further improve the coding efficiency, more than one quantizer, e.g., two scalar quantizers, can be used by quantization module 310. Which quantizer will be used for quantizing the current coefficient may depend on the information preceding the current coefficient in coding scan order. Such a quantization process is referred to as dependent quantization.

Referring to FIG. 3, encoding module 320 may be configured to encode the quantization level of each position in the coding block into the bitstream. In some embodiments, encoding module 320 may perform entropy encoding on the coding block. Entropy encoding may use various binarization methods, such as Golomb-Rice binarization, including, for example, EGk binarization and combined TR and limited EGk binarization, to convert each quantization level into a respective binary representation, such as binary bins. Then, the binary representation can be further compressed using entropy encoding algorithms, such as VLC. CAVLC. CABAC. SBAC. PIPE coding, and the like. The compressed data may be added to the bitstream. Besides the quantization levels, encoding module 320 may encode various other information, such as block type information of a coding unit, prediction mode information, partitioning unit information, prediction unit information, transmission unit information, motion vector information, reference frame information, block interpolation information, and filtering information input from, for example, prediction modules 304 and 306. In some embodiments, encoding module 320 may perform residual coding on a coding block to convert the quantization level into the bitstream. For example, after quantization, there may be N×M quantization levels for an N×M block. These N×M levels may be zero or non-zero values. The non-zero levels may be further binarized to binary bins if the levels are not binary, for example, using combined TR and limited EGk binarization.

Non-binary syntax elements may be mapped to binary codewords. The bijective mapping between symbols and codewords, for which typically simple structured codes are used, is called binarization. The binary symbols, also called bins, of both binary syntax elements and codewords for non-binary data may be coded using binary arithmetic coding. The core coding engine of CABAC can support two operating modes: a context coding mode, in which the bins are coded with adaptive probability models, and a less complex bypass mode that uses fixed probabilities of ½. The adaptive probability models are also called contexts, and the assignment of probability models to individual bins is referred to as context modeling.

According to some aspects of the present disclosure, in H.266/VVC, the Golomb-Rice binarization process (e.g., combined TR and limited EGk binarization) involves a number of parameters, such as a cutoff parameter, a Rice parameter, and an LDR of coefficient. The Rice parameter specifies the initial suffix code length. The cutoff parameter is used to specify the number of input value ranges that can use the initial suffix code length. The LDR is used to define the maximum suffix code length. In some examples, the LDR is set to be 15, and in other examples, it is set to be the larger value between 15 and the bit depth plus 6. If the bit depth is 16, then the LDR is 22. In some embodiments, the maximum length of binarized bins is set to 32. The maximum length of the binary bins can be used to determine the maximum length of the codeword prefix. In the current H.266/VVC specification, the value of the cutoff parameter is 5, and the length of the dynamic range of coefficient is 15. For the Rice parameter, it is defined as a fixed value of 1 for the transform skip residual coding (TSRC) mode and a value between 0) and 3 for RRC.

For example, FIG. 8 illustrates exemplary codewords used in Golomb-Rice binarization (e.g., combined TR and limited EGk binarization) to binarize an input value (e.g., an absolute level or remaining level of a quantization level), according to some embodiments of the present disclosure. In this example, the values of the cutoff parameter, the Rice parameter, and the LDR are set as 3, 2, and 22, respectively. As such, the initial suffix code length is 2, and this initial suffix code length is used for the first cutoff+1 (i.e., four) input value ranges [0, 3], [4, 7], [8, 11], and [12, 15]. After the first cutoff+1 input value ranges, the suffix code length increases by one for each input value range. For example, 3 bits are used for the codeword suffix for the value range [16, 23]. 4 bits are used for the input value range [24, 39], and so on. For the last input value range, LDR bits (i.e., 22 bits in this example) are used for the codeword suffix. The length of the prefix codeword increases one by one for each value range until it reaches to 10 bits for the last input range with LDR bits (e.g., 22-LDR bits in FIG. 8).

For the high bit depth and high bit rate video coding (e.g., the bit depth being 16 bits), the quantization levels are much larger on average than that in the current H.266/VVC, for example, due to the smaller quantization step size. From the example shown in FIG. 8, it can be seen that the number of bits used for the prefix and suffix for large quantization levels is higher than the number of bits used for the prefix and suffix for small quantization levels. As such, for high bit depth and high bit rate video coding, the current parameters (e.g., Rice parameter) used to binarize the quantization level may not be optimal, and the coding performance with the current VVC may be comprised.

With respect to the Rice parameters, to improve the accuracy of Rice parameter estimation from the computed template, a history-based Rice parameter derivation method can be used. A variable, namely localSumAbs, which is the sum of absolute levels of up to five neighboring positions in

Figure 9A:
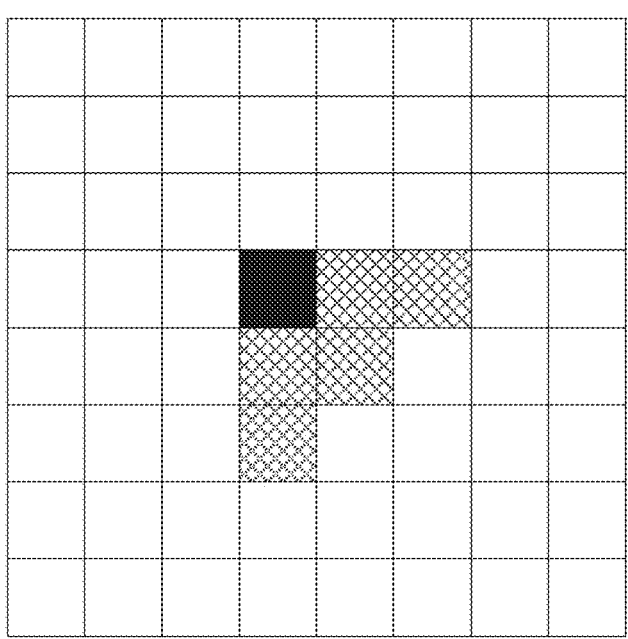
FIGS. 9A and 9B illustrate exemplary template patterns for determining the localSumAbs variable in a transform unit, according to some embodiments of the present disclosure.
Figure 9B:
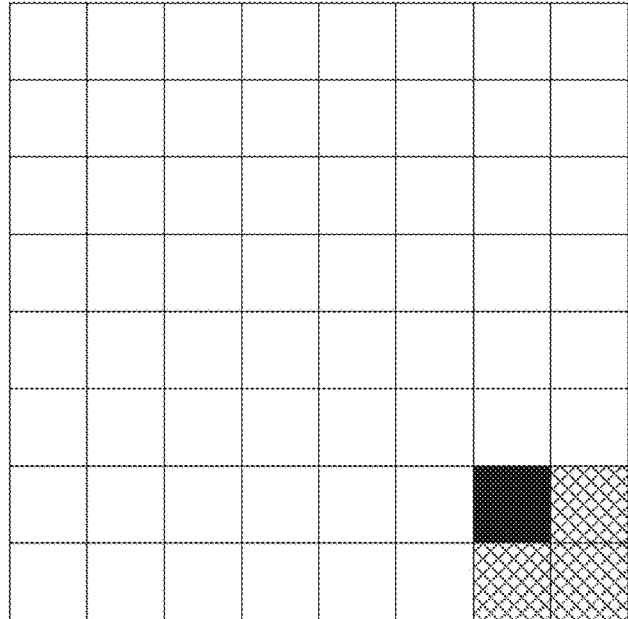

13 a transform unit, may be used to calculate the Rice parameter for the current position, as shown in FIGS. 9A and 9B. In FIGS. 9A and 9B, the solid black box represents the current position in a current transform unit, and the patterned boxes represent the neighboring positions of the current position in the current transform unit. As shown in FIG. 9A, the summation of the quantization levels (e.g., the remaining levels or absolute level) of five neighboring positions may be used to calculate the variable localSumAbs for the current position, which is in turn used to determine the Rice parameter of the current position. However, as shown in FIG. 9B, for some positions that are close to the boundary of the current transform unit, less than five neighboring positions may be available in the current transform unit for calculating the variable localSumAbs for those "boundary" current positions. In other words, at least one of the five neighboring positions of a "boundary" current position may be outside of the current transform unit.

To improve the accuracy of the Rice parameter estimation from the computed template, a history derived value (e.g., the value of a history variable), instead of 0, can be used to update the localSumAbs variable for current positions outside of the current transform unit, for example, as illustrated in the pseudo-code below:

```
locSumAbs = 0
if( xC < ( 1 << log2TbWidth ) − 1 ) {
    locSumAbs += AbsLevel[ xC + 1 ][ yC ]
    if( xC < ( 1 << log2TbWidth ) − 2 )
        locSumAbs += AbsLevel[ xC + 2 ][ yC ]
    else
        locSumAbs += histValue
    if( yC < ( 1 << log2TbHeight ) − 1 )
        locSumAbs += AbsLevel[ xC + 1 ][ yC + 1 ]
    else
        locSumAbs += histValue
```

14

-continued

```
}
else
    locSumAbs += 2 * histValue
    if( yC < ( 1 << log2TbHeight ) − 1 ) {
        locSumAbs += AbsLevel[ xC ][ yC + 1 ]
        if( yC < ( 1 << log2TbHeight ) − 2 )
            locSumAbs += AbsLevel[ xC ][ yC + 2 ]
        else
            locSumAbs += histValue
    }
    else
        locSumAbs += histValue
```

Inputs to the above pseudo-code process are the base level baseLevel, the color component index cIdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight. The output of this process is the localSumAbs variable. Given the array AbsLevel[x][y] for the transform block with component index cIdx and the top-left luma location (x0, y0), the variable locSumAbs is derived as specified by the above pseudo-code process. Specifically, in the italic portions of the above pseudo-code process, a history variable histValue is used to calculate the variable locSumAbs when at least one neighboring position of the current position is outside of the current transform unit.

The variable localSumAbs may be updated as follows $$locSumAbs = Clip3(0, 31, (locSumAbs \gg shiftVal) - baseLevel * 5).$$

The value of the variable shiftVal may be derived as follows:

```
if( !sps_rrc_rice_extension_flag )
    shiftVal = 0
else
    shiftVal = ( locSumAbs < Tx[ 0 ] ) ? Rx[ 0 ] : ( ( locSumAbs < Tx[ 1 ] ) ? Rx[ 1 ] :
        ( ( locSumAbs < Tx[ 2 ] ) ? Rx[ 2 ] : ( ( locSumAbs < Tx[ 3 ] ) ? Rx[ 3 ] : Rx[4] ) )
    )
```

That is, the value of the variable shiftVal may be either 0 if the RRC Rice parameter extension flag sps_rrc_rice_extension_flag is turned off, or can be calculated based on the value of the localSumAbs variable and the values of lists Tx[ ] and Rx[ ] shown in the above pseudo-code process if the RRC Rice parameter extension flag sps_rrc_rice_extension_flag is turned on. For example, the lists Tx[ ] and Rx[ ] may be specified as Tx[ ]={32, 128, 512, 2048}, and Rx[ ]={0, 2, 4, 6, 8}.

Given the variable locSumAbs, the Rice parameter cRiceParam may be first derived, for example, as specified in TABLE 1 below, and then updated as follows:

TABLE I

| | Specification of cRiceParam based on locSumAbs | | | | | | | | | | | | | | |
| --- | --- | --- | --- | --- | --- | --- | --- | --- | --- | --- | --- | --- | --- | --- | --- |
| | cRiceParam = cRiceParam + shiftVal.locSumAbs | | | | | | | | | | | | | | |
| 0 | 1 | 2 | 3 | 4 | 5 | 6 | 7 | 8 | 9 | 10 | 11 | 12 | 13 | 14 | 15 |
| cRiceParam 0 | 0 | 0 | 0 | 0 | 0 | 0 | 1 | 1 | 1 | 1 | 1 | 1 | 1 | 2 | 2 |
| | locSumAbs | | | | | | | | | | | | | | |
| 16 | 17 | 18 | 19 | 20 | 21 | 22 | 23 | 24 | 25 | 26 | 27 | 28 | 29 | 30 | 31 |
| cRiceParam 2 | 2 | 2 | 2 | 2 | 2 | 2 | 2 | 2 | 2 | 2 | 2 | 3 | 3 | 3 | 3 |

To maintain the history, the value of the history variable histValue may be updated at most once per transform unit, and the updated value of the history variable histValue may be used for determining the variable locSumAbs (and the corresponding Rice parameter) for a position in the next transform unit following the current transform unit. In other words, the value of the Rice parameter of a current position (e.g., a "boundary." current position) in a current transform unit may be determined based on the value of the history variable for a previous transform unit preceding the current transform unit.

In some embodiments, for each transform unit in RRC, the history variable his Value may be initialized, prior to decoding, by the value of history counter StatCoeff [cIdx] determined from the previous transform unit as follows:

$$histValue = 1 \ll StatCoeff[cIdx]$$

$$updateHist = 1$$

StatCoeff[cIdx] is a single history counter per color component cIdx. For example, the history counter StatCoeff [cIdx] may be updated once per transform unit from the quantization level (e.g., the absolute level or remain level) of the first, non-zero, Golomb-Rice coded position (e.g., coded with either abs_remainder or dec_abs_level syntax element) (i.e., the first, non-zero, Golomb-Rice coded quantization level) through a process of exponential moving average. updateHist=1 indicates that the initial value of the variable histValue may be updated in the current transform unit if there is at least one position which is coded with either abs_remainder or dec_abs_level syntax element, i.e., Golomb-Rice coded position.

In summary, the value of the history counter StatCoeff [cIdx] (and the corresponding value of the history variable histValue) for the previous transform unit would affect the value of the Rice parameter of a current position in the current transform unit, which would, in turn, affect the codeword length (e.g., the number of binary bins as the binary representation) after binarization. On the other hand, since the bit depth and/or the bit rate for encoding the picture would affect the quantization levels on average, adjusting the value of the history counter StatCoeff[cIdx] (and the corresponding value of the history variable histValue) based on the bit depth and/or the bit rate can improve the efficiency of binarization with optimized Rice parameters.

Referring back to FIG. 3, in some embodiments, encoding module 320 may be configured to determine the value of the Rice parameter of a current position in the current transform unit for Golomb-Rice binarization based on the value of a history variable for a previous transform unit preceding the current transform unit. The value of the history variable may be determined based on the bit depth and/or the bit rate for encoding the picture as described below in detail.

Figure 7:
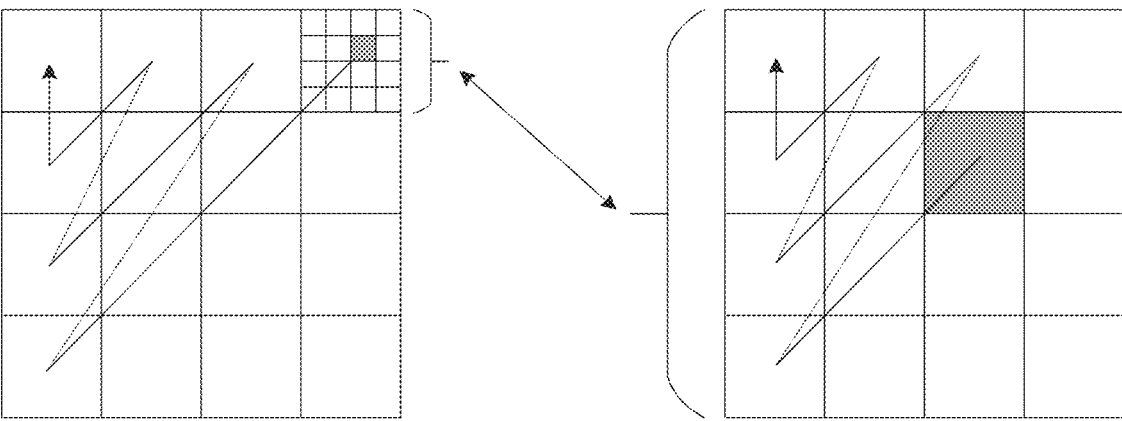
FIG. 7 illustrates an exemplary transform block encoded using regular residual coding (RRC), according to some embodiments of the present disclosure.

According to some aspects of the present disclosure, in H.266/VVC, the coding block is a transform block encoded using RRC. Transform blocks larger than 4×4 may be divided into disjunct 4×4 subblocks, which are processed using a reverse diagonal scan pattern. It is understood that H.266/VVC supports non-4×4 subblocks due to the support of non-square rectangular shape of transform blocks. For ease of description and without loss of generality, FIG. 7 depicts an example of a 16×16 transform block, where this transform block is further partitioned into 4×4 subblocks. The reverse diagonal scan pattern is used for processing the subblocks of a transform block as well as for processing the frequency positions within each subblock.

In RRC, the position of the last non-zero level (a.k.a., the last significant scan position) may be defined as the position of the last non-zero level along the coding scan order. The 2D coordinates (last_sig_coeff_x and last_sig_coeff_y) of the last non-zero level may be first coded with up to four syntax elements, i.e., two context-coded syntax elements-two last significant coefficient prefixes (last_sig_coeff_x_prefix and last_sig_coeff_y_prefix), and two bypass-coded syntax elements-two last significant coefficient suffixes (last_ sig_coeff_x_suffix and last_sig_coeff_x_suffix). Within a subblock, RRC may first code a context-coded bin-a coded subblock flag (sb_coded_flag) to indicate whether the current subblock has all the levels equal to zero or not. For example, if sb_coded_flag is equal to 1, there may be at least one non-zero coefficient in the current subblock: if sb_coded_flag is equal to 0), all coefficients in the current subblock will be zeros. It is understood that the sb_coded_flag for the last non-zero subblock, which has the last non-zero level may be derived from last_sig_coeff_x and last_sig_coeff_y according to the coding scan order without coding into the bitstream. Similarly, the sb_coded_flag for the first subblock, where the DC for the entire block resides, may be derived according to the coding scan order without coding into the bitstream. Other sb_coded_flag may be coded as context-coded bins. RRC may code subblock by subblock starting from the last non-zero subblock with a reverse coding scan order.

In order to guarantee the worst-case throughput, a value of remaining context-coded bins (remBinsPass1) may be used to limit the maximum number of context-coded bins. The initial value of remBinsPass1 may be calculated based, at least in part, on the length and width of the coding block. Within a subblock, RRC may code the level of each position with a reverse coding scan order. A predefined threshold may be compared with remBinsPass1 to determine whether the maximum number of context-coded bins has been reached. For example, the threshold of remBinsPass1 in H.266/VVC may be predefined to be 4.

absolute level (dec_abs_level, "decAbsLevel" in FIG. 10) may be coded as bypass-coded bins in the second coding pass ("pass 2" in FIG. 10) and the third coding pass ("pass 3" in FIG. 10), respectively, for the remaining level after coding the aforementioned context-coded bins. In addition, a coefficient sign flag of each non-zero level (coeff_sign_flag. "sign" in FIG. 10) may also be coded in the fourth coding pass ("pass 4" in FIG. 10) as a bypass-coded bin to fully represent the quantization level.

In some embodiments, a more general residual coding method uses level greater than flags (abs_level_gtxX_flag) and a remaining level bin to allow conditionally parsing the syntax elements for level coding of a transform block, and its corresponding binarization of absolute value of level is shown in TABLE II below. Here abs_level_gtxX_flag describes if the absolute value of level is greater than X, where X is an integer number, e.g., 0, 1, 2, . . . , or N. If abs_level_gtxX_flag is 0, where X is an integer between 0) and N–1, abs_level_gtx(X+1)_flag will not be present. If abs_level_gtxX_flag is 1, abs_level_gtx(X+1)_flag will be present. Moreover, if abs_level_gtxN_flag is 0 the remainder will not be present. When abs_level_gtxN_flag is 1, the remainder will be present, and it represents the value after removing (N+1) from the level. Typically, abs_level_gtxX_flag may be coded as context-coded bins, and the remaining level bin is coded as a bypass-coded bin.

TABLE II

| Residual Coding Based On abs_level_gtxX_flag Bins and Remainder Bin | | | | | | | | | | |
|---|---|---|---|---|---|---|---|---|---|---|
| | abs(lvl) | | | | | | | | | |
| | 0 | 1 | 2 | 3 | 4 | 5 | 6 | 7 | 8 | 9 ... |
| abs_level_gtx0_flag | 0 | 1 | 1 | 1 | 1 | 1 | 1 | 1 | 1 | 1 ... |
| abs_level_gtx1_flag | | 0 | 1 | 1 | 1 | 1 | 1 | 1 | 1 | 1 ... |
| abs_level_gtx2_flag | | | 0 | 1 | 1 | 1 | 1 | 1 | 1 | 1 ... |
| abs_level_gtx3_flag | | | | 0 | 1 | 1 | 1 | 1 | 1 | 1 ... |
| abs_remainder | | | | | 0 | 1 | 2 | 3 | 4 | 5 ... |

Figure 10:
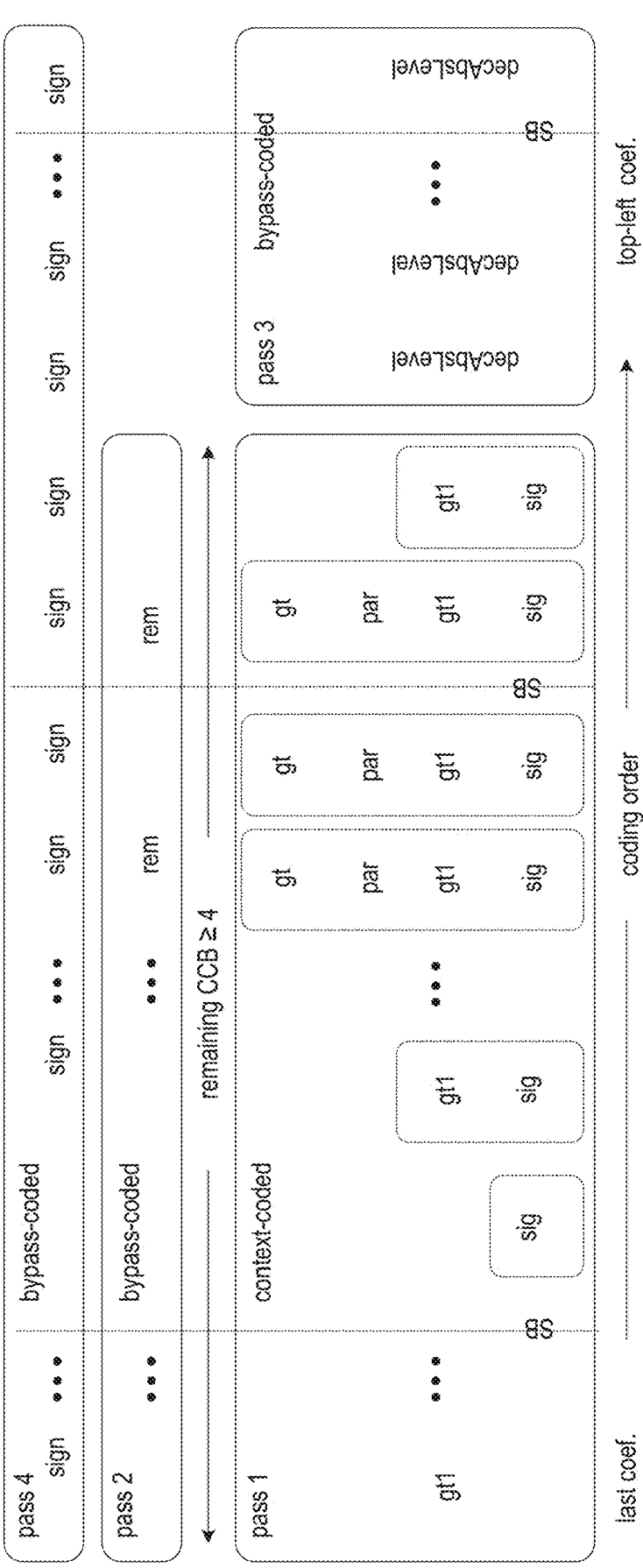
FIG. 10 illustrates coding passes in RRC.

As shown in FIG. 10, if remBinsPass1 is not smaller than 4 ("remaining CCB≥4" in FIG. 10), when encoding the quantization level of each position of a subblock ("SB" in FIG. 10), a significance flag (sig_coeff_flag. "sig" in FIG. 10) may be first coded into the bitstream to indicate if the level is zero or non-zero. If the level is non-zero, a greater than 1 flag (abs_level_gtx_flag[n][0] where n is the index along scan order of current position within the subblock, "gt1" in FIG. 10) may then be coded into the bitstream to indicate if the absolute level is 1 or greater than 1. If the absolute level is greater than 1, a parity flag (par_level_flag, "par" in FIG. 10) may then be coded into the bitstream to indicate if the level is an odd or even number, and then a greater than flag (abs_level_gtx_flag[n][1], "gt" in FIG. 10) may be present. The flags of par_level_flag and abs_level_gtx_flag[n][1] may also be used together to indicate the level is 2, 3, or greater than 3. After coding each above syntax element with the context coding method, i.e., context-coded bins, the value of remBinsPass1 may be decreased by 1. In other words, the significance flag, greater than 1 flag, parity flag, and greater than flag may be coded as context-coded bins for each position of each subblock in the first coding pass ("pass 1" in FIG. 10).

If the absolute level is greater than 5 or the value of remBinsPass1 is smaller than 4, two more syntax elements, a reminder (abs_remainder, "rem" in FIG. 10, also referred to as "remaining level" in the present disclosure), and an As shown in FIG. 3 dequantization module 312 may be configured to dequantize the quantization levels by dequantization module 312, and inverse transform module 314 may be configured to inversely transform the coefficients transformed by transform module 308. The reconstructed residual block generated by dequantization module 312 and inverse transform module 314 may be combined with the prediction units predicted through prediction module 304 or 306 to generate a reconstructed block.

Filter module 316 may include at least one among a deblocking filter, a sample adaptive offset (SAO), and an adaptive loop filter (ALF). The deblocking filter may remove block distortion generated by the boundary between blocks in the reconstructed picture. The SAO module may correct an offset to the original video by the unit of pixel for a video on which the deblocking has been performed. ALF may be performed based on a value obtained by comparing the reconstructed and filtered video and the original video. Buffer module 318 may be configured to store the reconstructed block or picture calculated through filter module 316, and the reconstructed and stored block or picture may be provided to inter prediction module 304 when inter prediction is performed.

Figure 4:
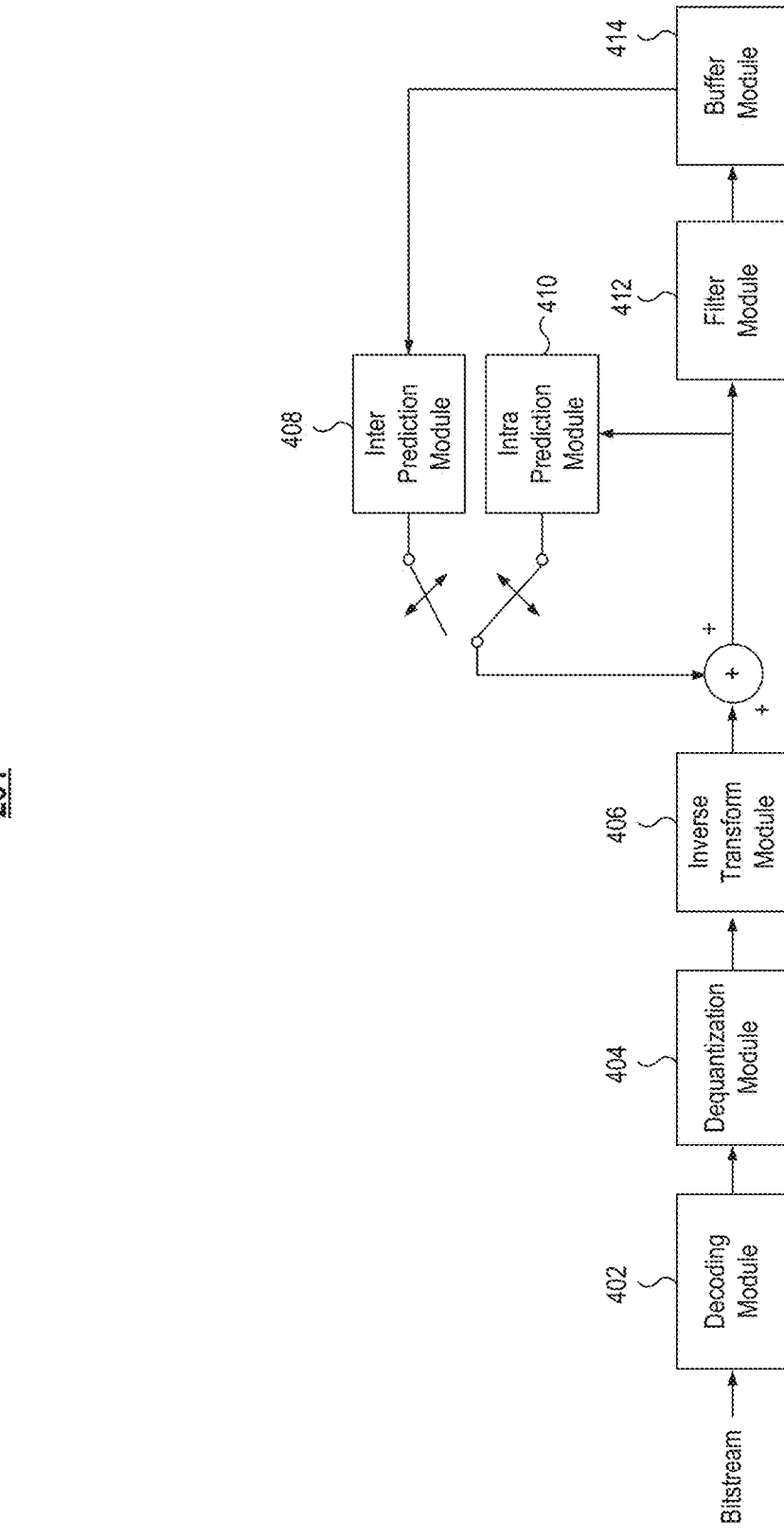
FIG. 4 illustrates a detailed block diagram of an exemplary decoder in the decoding system in FIG. 2, according to some embodiments of the present disclosure.

FIG. 4 illustrates a detailed block diagram of exemplary decoder 201 in decoding system 200 in FIG. 2, according to some embodiments of the present disclosure. As shown in FIG. 4, decoder 201 may include a decoding module 402, a dequantization module 404, an inverse transform module 406, an inter prediction module 408, an intra prediction module 410, a filter module 412, and a buffer module 414. It is understood that each of the elements shown in FIG. 4 is independently shown to represent characteristic functions different from each other in a video decoder, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on decoder 201.

When a video bitstream is inputted from a video encoder (e.g., encoder 101), the input bitstream may be decoded by decoder 201 in a procedure opposite to that of the video encoder. Thus, some details of decoding that are described above with respect to encoding may be skipped for ease of description. Decoding module 402 may be configured to decode the bitstream to obtain various information encoded into the bitstream, such as the quantization level of each position in the coding block. In some embodiments, decoding module 402 may perform entropy decoding (decompressing) corresponding to the entropy encoding (compressing) performed by the encoder, such as, for example, VLC, CAVLC, CABAC, SBAC, PIPE coding, and the like to obtain the binary representation (e.g., binary bins). Decoding module 402 may further convert the binary representations to quantization levels using Golomb-Rice binarization, including, for example, EGk binarization and combined TR and limited EGk binarization. Besides the quantization levels of the positions in the transform units, decoding module 402 may decode various other information, such as the parameters used for Golomb-Rice binarization (e.g., the Rice parameter), block type information of a coding unit, prediction mode information, partitioning unit information, prediction unit information, transmission unit information, motion vector information, reference frame information, block interpolation information, and filtering information. During the decoding process, decoding module 402 may perform rearrangement on the bitstream to reconstruct and rearrange the data from a 1D order into a 2D rearranged block through a method of inverse-scanning based on the coding scan order used by the encoder.

Dequantization module 404 may be configured to dequantize the quantization level of each position of the coding block (e.g., the 2D reconstructed block) to obtain the coefficient of each position. In some embodiments, dequantization module 404 may perform dependent dequantization based on quantization parameters provided by the encoder as well, including the information related to the quantizers used in dependent quantization, for example, the quantization step size used by each quantizer.

Inverse transform module 406 may be configured to perform inverse transformation, for example, inverse DCT, inverse DST, and inverse KLT, for DCT. DST, and KLT performed by the encoder, respectively, to transform the data from the transform domain (e.g., coefficients) back to the pixel domain (e.g., luma and/or chroma information). In some embodiments, inverse transform module 406 may selectively perform a transform operation (e.g., DCT, DST, KLT) according to a plurality of pieces of information such as a prediction method, a size of the current block, a prediction direction, and the like.

Inter prediction module 408 and intra prediction module 410 may be configured to generate a prediction block based on information related to the generation of a prediction block provided by decoding module 402 and information of a previously decoded block or picture provided by buffer module 414. As described above, if the size of the prediction unit and the size of the transform unit are the same when intra prediction is performed in the same manner as the operation of the encoder, intra prediction may be performed on the prediction unit based on the pixel existing on the left side, the pixel on the top-left side, and the pixel on the top of the prediction unit. However, if the size of the prediction unit and the size of the transform unit are different when intra prediction is performed, intra prediction may be performed using a reference pixel based on a transform unit.

The reconstructed block or reconstructed picture combined from the outputs of inverse transform module 406 and prediction module 408 or 410 may be provided to filter module 412. Filter module 412 may include a deblocking filter, an offset correction module, and an ALF. Buffer module 414 may store the reconstructed picture or block and use it as a reference picture or a reference block for inter prediction module 408 and may output the reconstructed picture.

Consistent with the scope of the present disclosure, encoding module 320 and decoding module 402 may be configured to adopt a scheme of quantization level binarization with Rice parameter adapted to the bit depth and/or the bit rate for encoding the picture of the video to improve the coding efficiency.

FIG. 12 illustrates a flow chart of an exemplary method 1200 of video encoding, according to some embodiments of the present disclosure. Method 1200 may be performed at the transform unit level by encoder 101 of encoding system 100 or any other suitable video encoding systems. Method 1200 may include operations 1202, 1204, 1206, and 1208, as described below. It is understood that some of the operations may be optional, and some of the operations may be performed simultaneously, or in a different order than shown in FIG. 12.

At operation 1202, a coefficient of each position in a current transform unit is quantized to generate quantization levels of the current transform unit. For example, as shown in FIG. 3, quantization module 310 may be configured to quantize the coefficient of each position in the current transform unit to generate the respective quantization level. In some embodiments, the transform unit corresponds to a plurality of transform blocks (e.g., three) in RRC.

At operation 1204, a value of a Rice parameter of a current position in the current transform unit for Golomb- Rice binarization is determined based on a value of a history variable for a previous transform unit preceding the current transform unit. The value of the history variable is determined based on a bit depth and/or the bit rate for encoding the picture. In some embodiments, at least one of neighboring positions of the current position is outside of the current transform unit. In other words, the history variable may be applied to the "boundary" positions, for example, as shown in FIG. 9B.

For example, as shown in FIG. 3, encoding module 320 may be configured to determine the value of the Rice parameter of the current position in the current transform unit for Golomb-Rice binarization based on the value of the history variable for the previous transform unit. Encoding module 320 may be further configured to determine the value of the history variable based on the bit depth and/or the bit rate for encoding the picture.

Figure 13:
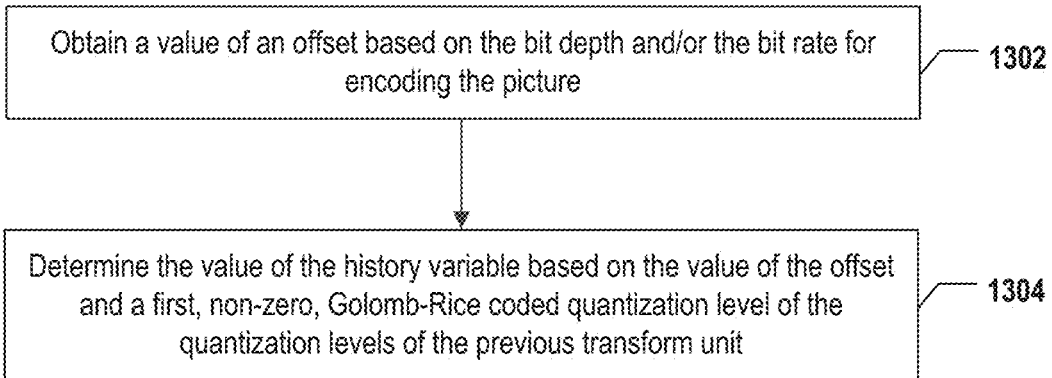
FIG. 13 illustrates a flow chart of an exemplary method for determining a value of a history variable, according to some embodiments of the present disclosure.

In some embodiments, as shown in FIG. 13, to determine the value of the history variable, at operation 1302, a value of an offset is obtained based on the bit depth and/or the bit rate for encoding the picture, and at operation 1304, the value of the history variable is determined based on the value of the offset and a first, non-zero. Golomb-Rice coded quantization level, e.g., coded with either the remaining level (abs_remainder syntax element) or the absolute level (dec_abs_level syntax element) of the quantization levels of the previous transform unit. The value of the offset may be a non-zero integer. For example, the bit depth is 16 bits for high bit depth and high bit rate video coding, and the value of the offset is 2. In some embodiments, the value of the offset may be increased as the bit depth increases, and vice versa. In other words, the value of the offset may be positively correlated to the bit depth. In one example, when the bit depth is lower than 16 bits, the value of the offset may be smaller than 2, such as 1. In another example, when the bit depth is higher than 16 bits, the value of the offset may be larger than 2, such as 3, 4, 5, etc. Additionally or alternatively, the value of the offset may be determined based on the bit rate, which may be in turned determined based on the quantization step size, i.e., the QP. For example, a higher QP may result in a lower bit rate, which may in turn result in a smaller value of the offset: a lower QP may result in a higher bit rate, which may in turn result in a higher value of the offset. In other words, the value of the offset may be positively correlated to the bit rate, and negatively correlated to the QP. In some embodiments, the value of the offset may be the same for different pictures of a video or may be different for different pictures of the video. In other words, the value of the offset may be adjusted not only based on the bit depth of encoding, but also based on the specific picture to which the encoding is applied.

In some embodiments, the binary representation of the current position includes bypass-coded bins in RRC, such as the dec_abs_level bins or abs_remainder bins. In some embodiments, to convert the quantization level of the current position, an absolute level of the quantization level of the current position is converted into the binary representation, such as bypass-coded dec_abs_level bins in RRC. For example, the bypass-coded dec_abs_level bins in RRC may be binarized from the absolute level of the quantization level using Golomb-Rice binarization with a Rice parameter adapted to the bit depth and/or the bit rate for encoding the picture as shown in the example pseudo-code process below:

```
if( updateHist & & dec_abs_level[ n ] > 0 ) {
    StatCoeff[ cIdx ] = (StatCoeff[ cIdx ] + Floor( Log2(dec_abs_level[ n ] ) ) + offset)
>> 1
    updateHist = 0
}
```

In the above pseudo-code process, updateHist & & dec_abs_level[n]>0 indicates that the history variable histValue can still be updated in this transform unit since it has not been updated more than once in this transform unit, and that the absolute level of the quantization level dec_abs_level[n] is for the first, non-zero position coded with dec_abs_level. As a result, the value of the history counter StatCoeff[cIdx] may be updated from its value (e.g., for the previous transform unit) by two parts: (1) Floor(Log 2(dec_abs_level[n])), and (2) offset. The first part may be determined based on the absolute level of the first, non-zero, Golomb-Rice coded quantization levels, e.g., coded with dec_abs_level in this transform unit. As described above, the value of the offset may be obtained based on the bit depth and/or the bit rate for encoding the picture, such as 2 for 16 bits bit depth. updateHist=0 indicates that the updated value of the history variable histValue (from the updated history counter StatCoeff[cIdx]) cannot be updated again in this transform unit since it can be updated at most once per transform unit.

In some embodiments, to convert the quantization level of the current position, a remaining level of the quantization level of the current position is converted into the binary representation, such as a bypass-coded abs_remainder bin in RRC. For example, the bypass-coded bin abs_remainder in RRC may be binarized from the remaining level of the quantization level using Golomb-Rice binarization with a Rice parameter adapted to the bit depth and/or the bit rate for encoding the picture as shown in the example pseudo-code process below:

```
if( updateHist & & abs_remainder[ n ] > 0 ) {
    StatCoeff[ cIdx ] = (StatCoeff[ cIdx ] + Floor( Log2(abs_remainder[ n ] ) ) +
offset) >> 1
    updateHist = 0
}
```

In the above pseudo-code process, updateHist & & abs_remainder[n]>0 indicates that the history variable histValue can still be updated in this transform unit since it has not been updated more than once in this transform unit, and that the remaining level of the quantization level abs_remainder1[n] is for the first, non-zero position coded with this syntax element. As a result, the value of the history counter StatCoeff[cIdx] may be updated from its value (e.g., for the previous transform unit) by two parts: (1) Floor(Log 2(abs_remainder[n])), and (2) offset. The first part may be determined based on the remaining level of the first, non-zero quantization levels coded with abs_remainder in this transform unit. As described above, the value of the offset may be obtained based on the bit depth and/or the bit rate for encoding the picture, such as 2 for 16 bits bit depth. updateHist=0 indicates that the updated value of the history variable histValue (from the updated history counter StatCoeff[cIdx]) cannot be updated again in this transform unit since it can be updated at most once per transform unit.

Once the value of the history variable histValue is determined, either as the initial value or updated value, for a previous transform unit, the value of the localSumAbs variable for a current position in the current transformation unit can be determined accordingly, for example, based on the pseudo-code process above, and the value of the Rice parameter for the current position can be in turn determined, for example, based on TABLE I above and the value of the shiftVal variable.

Referring back to FIG. 12, at operation 1206, the quantization level of the current position is converted into a binary representation using Golomb-Rice binarization with the value of the Rice parameter. As shown in FIG. 3, encoding module 320 may be configured to convert the quantization level, either the absolute level or the remaining level, of the current position into a binary representation, such as binary bins, using combined TR and limited EGk binarization with the value of the Rice parameter. Since the Rice parameter is adjusted based on the bit depth and/or the bit rate for encoding the picture, the length of the resulting binary representation, e.g., the number of binary bins, can be optimized, thereby improving the coding efficiency.

At operation 1208, the binary representation of the current position is compressed into a bitstream. In some embodiments, the value of the Rice parameter is compressed into the bitstream as well. As shown in FIG. 3, encoding module 320 may be configured to compress the binary representations and the values of the Rice parameter for each position in the current transform unit into the bitstream using entropy coding algorithms, for example, CABAC.

FIG. 14 illustrates a flow chart of an exemplary method 1400 of video decoding, according to some embodiments of the present disclosure. Method 1400 may be performed at the transform unit level by decoder 201 of decoding system 200 or any other suitable video decoding systems. Method 1400 may include operations 1402, 1404, and 1406 as described below. It is understood that some of the operations may be optional, and some of the operations may be performed simultaneously, or in a different order other than shown in FIG. 14.

At operation 1402, a bitstream is decompressed to obtain a binary representation of a current position in the current transform unit, and a value of a Rice parameter of the current position for Golomb-Rice binarization. The value of the Rice parameter is determined based on a value of a history variable for a previous transform unit preceding the current transform unit. The value of the history variable is determined based on at least one of a bit depth or a bit rate for encoding the picture. As shown in FIG. 4, decoding module 402 may be configured to decompress the bitstream to obtain the binary representations (e.g., binary bins) of the positions in the current transform units as well as the values of the Rice parameters of the positions, as described above in detail using entropy coding algorithms, for example, CABAC.

At operation 1404, the binary representation is converted into a quantization level of the current position using Golomb-Rice binarization with the value of the Rice parameter. As shown in FIG. 4, decoding module 402 may be configured to convert the binary representations (e.g., binary bins) into quantization levels (e.g., absolute levels or remaining levels) of the positions in the current transform unit using combined TR and limited EGk binarization with the values of the Rice parameter.

At operation 1406, the quantization level of the current position is dequantized to generate a coefficient of the current position. As shown in FIG. 4, dequantization module 404 may be configured to dequantize the quantization level of each position to generate the coefficient of the respective position in the transform unit.

According to some aspects of the present application, the scheme of quantization level binarization with Rice parameter adapted to the bit depth and/or the bit rate for encoding the picture of the video disclosed herein is applied in bypass coding modes in RRC.

Figure 11A:
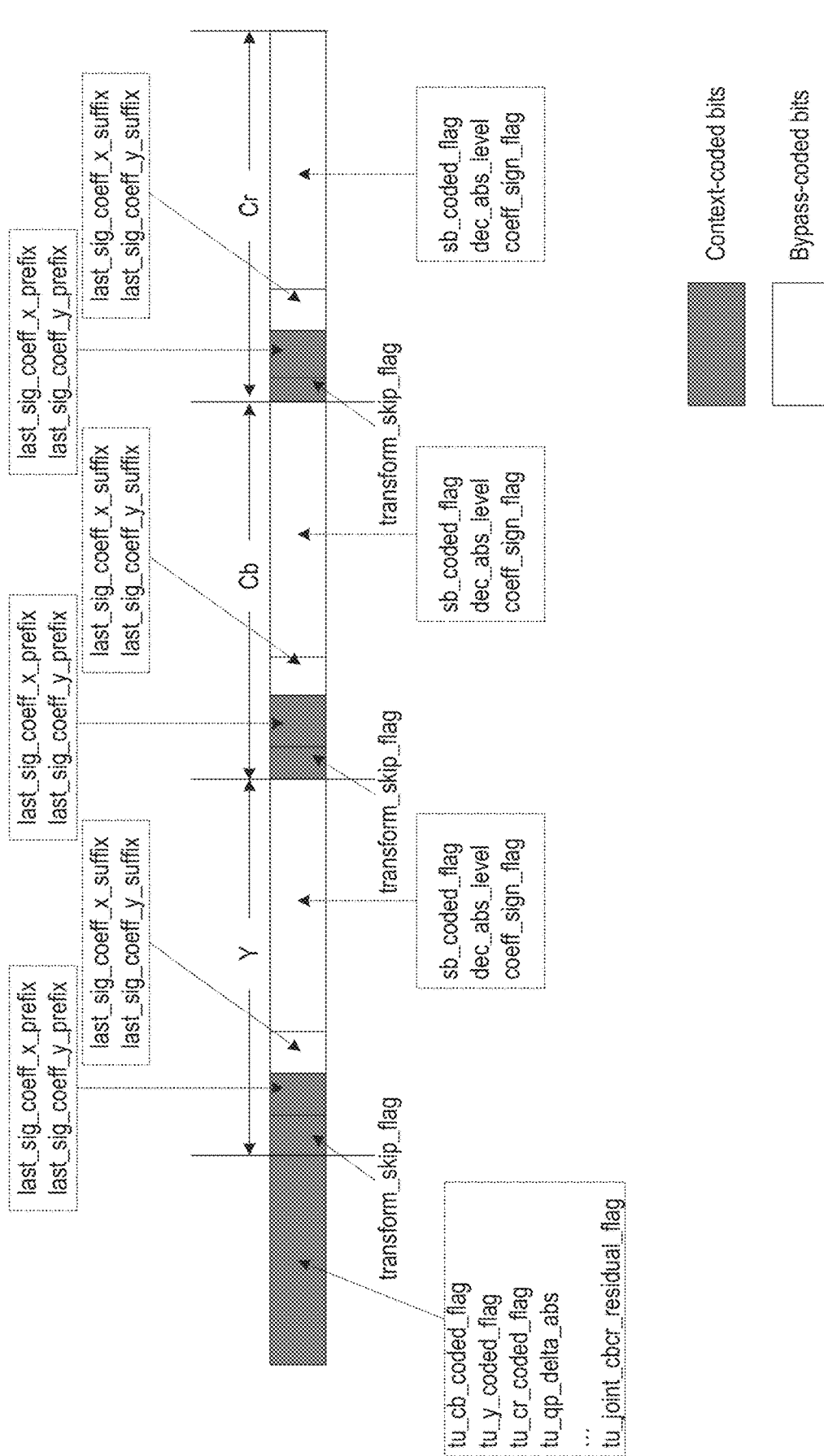
FIG. 11A illustrates an exemplary bypass coding mode in RRC, according to some embodiments of the present disclosure.

FIG. 11A illustrates an exemplary bypass coding mode in RRC, according to some embodiments of the present disclosure. As shown in FIG. 11A, the bitstream may start from transform unit bins of a transform unit. Various transform unit bins may remain as context-coded bins for context coding in CABAC. The transform unit bins may include a coded Cb transform block flag (tu_cb_coded_flag), a coded Cr transform block flag (tu_cr_coded_flag), a coded luma transform block flag (tu_v_coded_flag), a quantization parameter delta value (cu_qp_delta_abs), a chroma quantization parameter offset flag (cu_chroma_qp_offset_flag), a chroma quantization parameter offset index (cu_chroma_qp_offset_idx), a joint chroma flag (tu_joint_cbcr_residual_flag), and transform skip flags (transform_skip_flag). It is understood that transform unit bins may also include a bypass-coded bin, such as a quantization parameter delta sign flag (cu_qp_delta_sign_flag) in some examples.

As shown in FIG. 11A, the transform unit may correspond to one coding block (e.g., transform block for RRC) of luma samples ("Y" in FIG. 11A) and two corresponding coding blocks of chroma samples ("Cb" and "Cr" in FIG. 11A). Transform unit bins thus may include three transform_skip_flags for Y, Cb, and Cr coding blocks, respectively, each of which is a context-coded bin. For each coding block, the first residual coding bin of the coding block that is to be encoded/decoded in the bitstream after transform_skip_flag may be the last significant coefficient prefixes (last_sig_coeff_x_prefix and last_sig_coeff_y_prefix), which remain as context-coded bins. All other residual coding bins in each coding block may be bypass-coded bins, as shown in FIG. 11A. For example, the bypass-coded residual coding bins may include the last significant coefficient suffixes (last_sig_coeff_x_suffix and last_sig_coeff_y_suffix), the coded subblock flag (sb_coded_flag), the absolute level (dec_abs_level), and the coefficient sign flag (coeff_sign_flag).

That is, the bypass coding mode may be enabled for each coding block after last_sig_coeff_x_prefix and last_sig_coeff_y_prefix and before sb_coded_flag. In some embodiments in which last_sig_coeff_x_sufix and last_sig_coeff_y_sufix also need to be coded, the bypass coding mode may be enabled for each coding block after last_sig_coeff_x_prefix and last_sig_coeff_y_prefix and before last_sig_coeff_x_sufix and last_sig_coeff_y_sufix. In other words, the bypass coding mode may be enabled for each coding block right after last_sig_coeff_x_prefix and last_sig_coeff_y_prefix. The residual coding bin-sb_coded_flag may be changed from a context-coded bin to a bypass-coded bin for each position of each subblock in the bypass coding mode. The coding of all other context-coded bins, such as the significance flag (sig_coeff_flag), greater than 1 flag (abs_level_gtx_flag[n][0]), parity flag (par_level_flag), and greater than flag (abs_level_gtx_flag[n][1]), may be skipped, for example, by setting the value of remaining context-coded bins (remBinsPass1) to be less than the threshold 4, e.g., to be 0). The coding of the remaining level/reminder (abs_remainder[n]) may thus be skipped as well. In other words, in the bypass coding mode, the first and second coding passes of each position of each subblock of a coding block may be skipped, such that the context-coded bins may not occur in the first coding pass. As a result, each coding block may be coded using only bypass-coded bins except for last_sig_coeff_x_prefix and last_sig_coeff_y_prefix in the high throughput mode. The coding of each quantization level may be done by the bypass-coded absolute level (dec_abs_level), as opposed to the remaining level/reminder (abs_remainder).

Figure 11B:
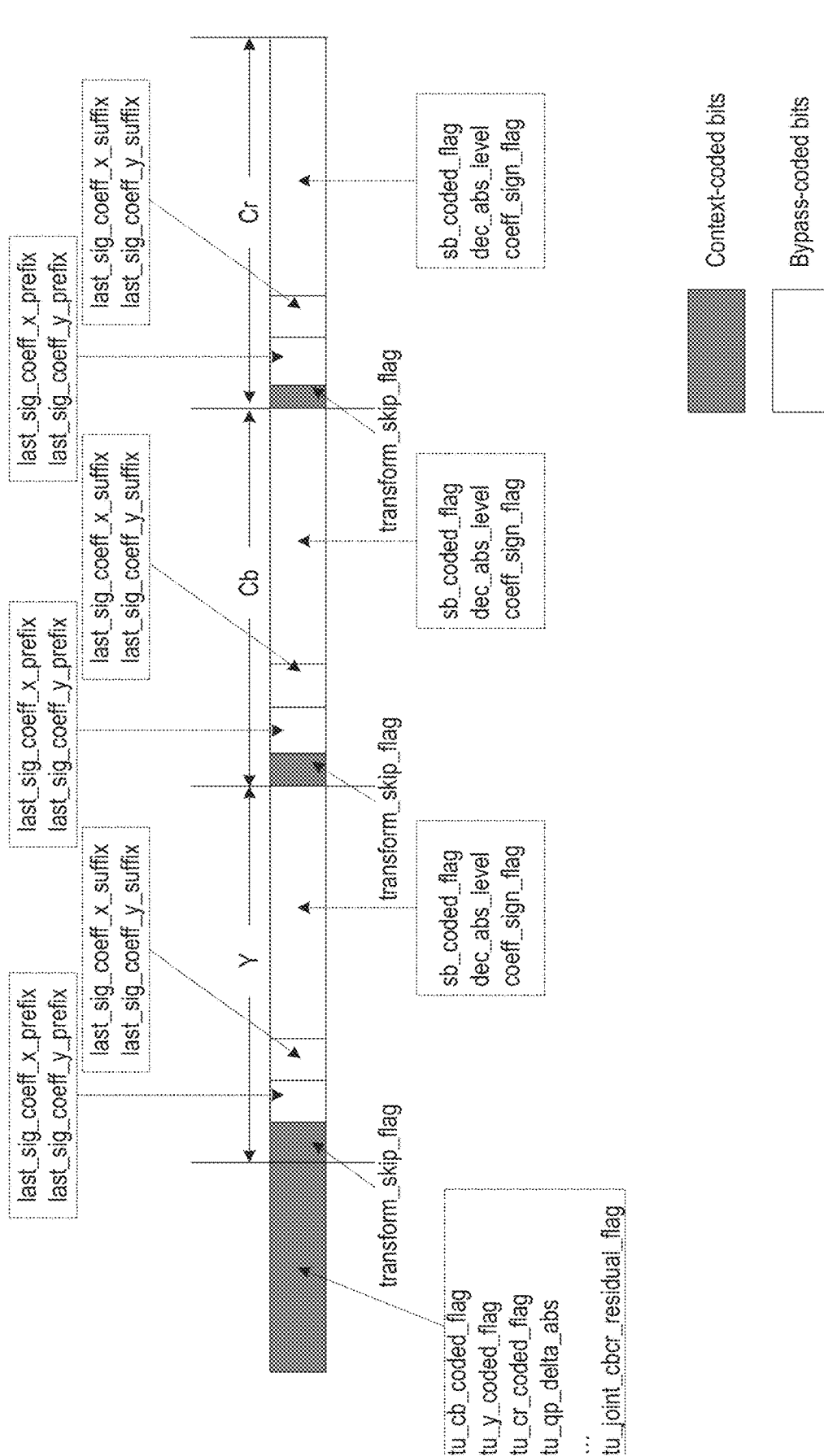
FIG. 11B illustrates another exemplary bypass coding mode in RRC, according to some embodiments of the present disclosure.

FIG. 11B illustrates another exemplary bypass coding mode in RRC, according to some embodiments of the present disclosure. Different from the bypass coding in FIG. 11A, the bypass coding mode of FIG. 11B further changes last_sig_coeff_x_prefix and last_sig_coeff_y_prefix from context-coded bins to bypass-coded bins, such that each coding block may be coded using only bypass-coded bins in the bypass coding mode in FIG. 11B. As shown in FIG. 11B, the bypass coding mode may be enabled at the coding block level. Compared with the scheme in FIG. 11A, the scheme in FIG. 11B can further improve the throughput of video coding by changing the last significant coefficients prefixes from context-coded bins to bypass-code bins. For very high bit rate and high bit depth operating range, the bits for the position of the last significant coefficients may also be quite high because most of the blocks are coded as smaller block sizes. The derivation of the context indices of last_sig_coeff_x_prefix and last_sig_coeff_y_prefix may impact the throughput because index of the context variables is derived for each bin of last_sig_coeff_x_prefix and last_sig_coeff_y_prefix.

Figure 11C:
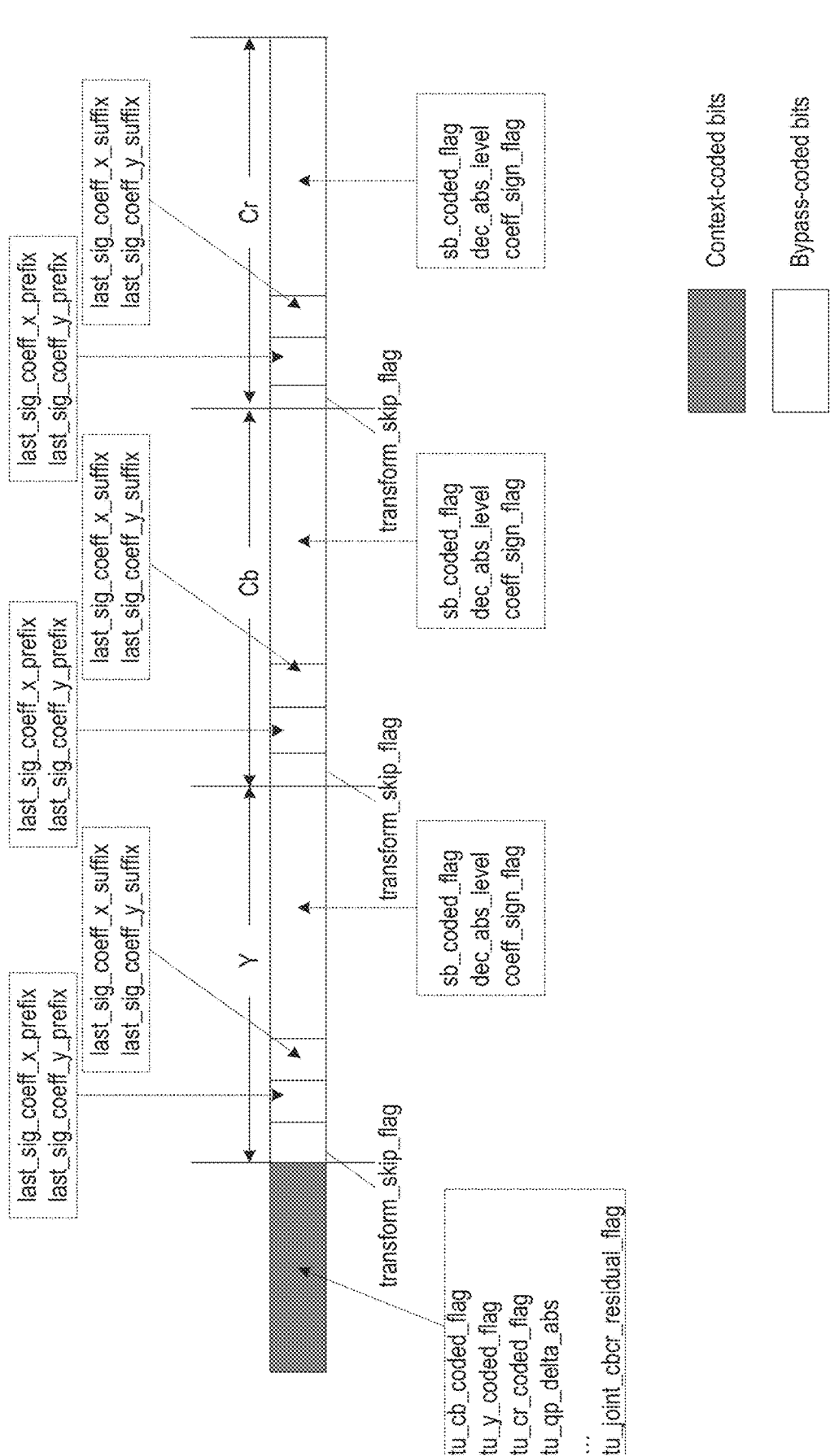
FIG. 11C illustrates still another exemplary bypass coding mode in transform unit (TU) coding, according to some embodiments of the present disclosure.

FIG. 11C illustrates still another exemplary bypass coding mode in transform unit coding, according to some embodiments of the present disclosure. Different from the bypass coding mode in FIG. 11B, the bypass coding mode of FIG. 11C further changes transform_skip_flag from context-coded bin to bypass-coded bin.

Figure 11D:
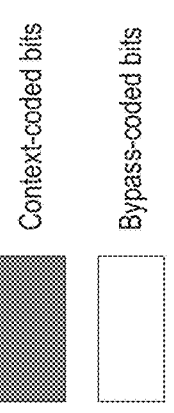
FIG. 11D illustrates an exemplary bypass coding mode in transform unit coding, according to some embodiments of the present disclosure.

FIG. 11D illustrates still another exemplary bypass coding mode in transform unit coding, according to some embodiments of the present disclosure. Different from the bypass alignment scheme in FIG. 11C, the bypass coding mode of FIG. 11D further changes transform unit bins of the transform unit from context-coded bins to bypass-code bins, such that all the transform unit bins of the transform unit are coded as bypass-code bins as well in the bypass coding mode. For example, in the bypass coding mode, besides transform_skip_flags, tu_cb_coded_flag, tu_cr_coded_flag, tu_v_coded_flag, cu_qp_delta_abs, cu_chroma_qp_offset_flag, cu_chroma_qp_offset_idx, and tu_joint_cbcr_residual_flag may be changed from context-coded bins to bypass-coded bins. As a result, the transform unit and three corresponding coding blocks may be coded using only bypass-coded bins in the bypass coding mode in FIG. 11D. Compared with the scheme in FIG. 11C, the bypass coding mode in FIG. 11D can further improve the throughput of video coding by coding the transform unit bins as only bypass-coded bins to avoid any switch between context coding and bypass coding by the CABAC coding engine when coding the transform unit. The bypass coding mode may be enabled at the transform unit level.

It is understood that in some examples, the history counter StatCoeff[cIdx] may be adjusted in different manners for remaining level/remainder bins (abs_remainder) and absolute level bins (dec_abs_level) of the quantization level. For example, if the first, non-zero, Golomb-Rice coded transform coefficient in a transform unit is coded as abs_remainder, the history counter StatCoeff[cIdx] may be designed to be larger than the history counter StatCoeff[cIdx] if the first, non-zero, Golomb-Rice coded transform coefficient in the transform unit is coded as dec_abs_level. This design may be reasonable when both abs_remainder and dec_abs_level are allowed to code coefficient levels. If abs_remainder is used to update the history counter StatCoeff[cIdx], it means that the absolute levels within the current transform unit most likely are relatively large values. If dec_abs_level is used to update the history counter StatCoeff[cIdx], it means that the absolute levels within the current transform unit may be relatively small values.

However, in the bypass coding modes in RRC disclosed herein, since the coding of abs_remainder bins is skipped, and only the coding of dec_abs_level bins is allowed. Thus, only the relatively small value of the history counter StatCoeff[cIdx] may be used if no offset is applied to adjust the value of the history counter. As described above, an offset may be applied in determining the value of the history counter StatCoeff[cIdx] for coding dec_abs_level bins. In some embodiments, a bypass flag (bypassFlag) indicative of a bypass coding mode is applied to switch the offset on and off in different modes as follows:

$$Statcoeff[cIdx] = (StatCoeff[cIdx] +$$
$$Floor(Log2(dec\_abs\_level[\ ])) + (bypassFlag\ ?\ Offset:0)) \gg 1.$$

If bypassFlag is equal to 1, a bypass coding mode is enabled and the absolute levels for all the quantization levels are coded using dec_abs_level bins, but not using abs_remainder bins, in the bypass coding mode in RRC, and the offset ("Offset." e.g., 2) is applied in determining the value of the history counter StatCoeff[cIdx]. If bypassFlag is equal to 0, a bypass mode is not enabled and both abs_remainder bins and dec_abs_level bins can be used to code the quantization levels, and the offset may not be applied ("0") in determining the value of history counter StatCoeff[cIdx] for coding dec_abs_level bins.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a processor, such as processor 102 in FIGS. 1 and 2. By way of example, and not limitation, such computer-readable media can include RAM. ROM, EEPROM. CD-ROM or other optical disk storage. HDD, such as magnetic disk storage or other magnetic storage devices. Flash drive. SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a method for encoding a picture of a video including a current transform unit is disclosed. A coefficient of each position in the current transform unit is quantized by a processor to generate quantization levels of the current transform unit. A value of a Rice parameter of a current position in the current transform unit for Golomb-Rice binarization is determined by the processor based on a value of a history variable for a previous transform unit preceding the current transform unit. The value of the history variable is determined based on at least one of a bit depth or a bit rate for encoding the picture. The quantization level of the current position is converted by the processor into a binary representation using Golomb-Rice binarization with the value of the Rice parameter. The binary representation of the current position is compressed by the processor into a bitstream.

In some embodiments, a value of an offset is obtained based on the at least one of the bit depth or the bit rate for encoding the picture, and the value of the history variable is determined based on the value of the offset and a first, non-zero, Golomb-Rice coded quantization level of the quantization levels of the previous transform unit.

In some embodiments, the value of the offset is a non-zero integer.

In some embodiments, the bit depth is 16 bits, and the value of the offset is 2.

In some embodiments, at least one of neighboring positions of the current position is outside of the current transform unit.

In some embodiments, the coding block is a transform block encoded using RRC.

In some embodiments, the binary representation of the current position includes a bypass-coded bin in RRC.

In some embodiments, to convert the quantization level of the current position, an absolute level of the quantization level of the current position is converted into the binary representation.

According to another aspect of the present disclosure, a system for encoding a picture of a video including a current transform unit includes a memory configured to store instructions and a processor coupled to the memory. The processor is configured to, upon executing the instructions, quantize a coefficient of each position in the current transform unit to generate quantization levels of the current transform unit. The processor is also configured to, upon executing the instructions, determine a value of a Rice parameter of a current position in the current transform unit for Golomb-Rice binarization based on a value of a history variable for a previous transform unit preceding the current transform unit. The value of the history variable is determined based on at least one of a bit depth or a bit rate for encoding the picture. The processor is further configured to, upon executing the instructions, convert the quantization level of the current position into a binary representation using Golomb-Rice binarization with the value of the Rice parameter. The processor is further configured to, upon executing the instructions, compress the binary representation of the current position into a bitstream.

In some embodiments, the processor is further configured to obtain a value of an offset based on the at least one of the bit depth or the bit rate for encoding the picture, and determine the value of the history variable based on the value of the offset and a first, non-zero, Golomb-Rice coded quantization level of the quantization levels of the previous transform unit.

In some embodiments, the value of the offset is a non-zero integer.

In some embodiments, the bit depth is 16 bits, and the value of the offset is 2.

In some embodiments, at least one of neighboring positions of the current position is outside of the current transform unit.

In some embodiments, the coding block is a transform block encoded using RRC.

In some embodiments, the binary representation of the current position includes a bypass-coded bin in RRC.

In some embodiments, to convert the quantization level of the current position, the processor is further configured to convert an absolute level of the quantization level of the current position into the binary representation.

According to still another aspect of the present disclosure, a non-transitory computer-readable medium storing instructions that, when executed by a processor, perform a process for encoding a picture of a video including a current transform unit is disclosed. The process includes quantizing a coefficient of each position in the current transform unit to generate quantization levels of the current transform unit. The process also includes determining a value of a Rice parameter of a current position in the current transform unit for Golomb-Rice binarization based on a value of a history variable for a previous transform unit preceding the current transform unit. The value of the history variable is determined based on at least one of a bit depth or a bit rate for encoding the picture. The process further includes converting the quantization level of the current position into a binary representation using Golomb-Rice binarization with the value of the Rice parameter. The process further includes compressing the binary representation of the current position into a bitstream.

According to yet another aspect of the present disclosure, a method for decoding a picture of a video including a current transform unit is disclosed. A bitstream is decompressed by a processor to obtain a binary representation of a current position in the current transform unit, and a value of a Rice parameter of the current position for Golomb-Rice binarization are obtained. The value of the Rice parameter is determined based on a value of a history variable for a previous transform unit preceding the current transform unit. The value of the history variable is determined based on at least one of a bit depth or a bit rate for decoding the picture. The binary representation is converted by the processor into a quantization level of the current position using Golomb-Rice binarization with the value of the Rice parameter. The quantization level of the current position is dequantized by the processor to generate a coefficient of the current position.

In some embodiments, the value of the history variable is determined by obtaining a value of an offset based on the at least one of the bit depth or the bit rate for decoding the picture, and determining the value of the history variable based on the value of the offset and a first, non-zero, Golomb-Rice coded quantization level of the previous transform unit.

In some embodiments, the value of the offset is a non-zero integer.

In some embodiments, the bit depth is 16 bits, and the value of the offset is 2.

In some embodiments, at least one of neighboring positions of the current position is outside of the current transform unit.

In some embodiments, the coding block is a transform block encoded using RRC.

In some embodiments, the binary representation of the current position includes a bypass-coded bin in RRC.

In some embodiments, to convert the quantization level of the current position, an absolute level of the quantization level of the current position is converted into the binary representation.

According to yet another aspect of the present disclosure, a system for decoding a picture of a video including a current transform unit includes a memory configured to store instructions and a processor coupled to the memory. The processor is configured to, upon executing the instructions, decompress a bitstream to obtain a binary representation of a current position in the current transform unit, and a value of a Rice parameter of the current position for Golomb-Rice binarization. The value of the Rice parameter is determined based on a value of a history variable for a previous transform unit preceding the current transform unit. The value of the history variable is determined based on at least one of a bit depth or a bit rate for decoding the picture. The processor is also configured to, upon executing the instructions, convert the binary representation into a quantization level of the current position using Golomb-Rice binarization with the value of the Rice parameter. The processor is further configured to, upon executing the instructions, dequantize the quantization level of the current position to generate a coefficient of the current position.

In some embodiments, the value of the history variable is determined by obtaining a value of an offset based on the at least one of the bit depth or the bit rate for decoding the picture, and determining the value of the history variable based on the value of the offset and a first, non-zero, Golomb-Rice coded quantization level of the previous transform unit.

In some embodiments, the value of the offset is a non-zero integer.

In some embodiments, the bit depth is 16 bits, and the value of the offset is 2.

In some embodiments, at least one of neighboring positions of the current position is outside of the current transform unit.

In some embodiments, the coding block is a transform block encoded using RRC.

In some embodiments, the binary representation of the current position includes a bypass-coded bin in RRC.

In some embodiments, to convert the quantization level of the current position, the processor is further configured to convert the binary representation into an absolute level of the quantization level of the current position.

According to yet another aspect of the present disclosure, a non-transitory computer-readable medium storing instructions that, when executed by a processor, perform a process for decoding a picture of a video including a current transform unit is disclosed. The process includes decompressing a bitstream to obtain a binary representation of a current position in the current transform unit, and a value of a Rice parameter of the current position for Golomb-Rice binarization. The value of the Rice parameter is determined based on a value of a history variable for a previous transform unit preceding the current transform unit. The value of the history variable is determined based on at least one of a bit depth or bit rate for decoding the picture. The process also includes converting the binary representation into a quantization level of the current position using Golomb-Rice binarization with the value of the Rice parameter. The process further includes dequantizing the quantization level of the current position to generate a coefficient of the current position.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method for encoding a picture of a video, the picture comprising a current transform unit, the method comprising:
   quantizing, by a processor, a coefficient of each position in the current transform unit to generate quantization levels of the current transform unit;
   determining, by the processor, a value of a Rice parameter of a current position in the current transform unit for Golomb-Rice binarization based on a value of a history variable for a previous transform unit preceding the current transform unit, wherein the value of the history variable is determined based on at least one of a bit depth or a bit rate for encoding the picture;

converting, by the processor, the quantization level of the current position into a binary representation using Golomb-Rice binarization with the value of the Rice parameter; and
   compressing, by the processor, the binary representation of the current position into a bitstream;
   wherein the method further comprises:
      determining the value of the history variable based on a value of an offset and a first, non-zero, Golomb-Rice coded quantization level of the quantization levels of the previous transform unit.

2. The method of claim 1, further comprising:
   obtaining the value of the offset based on the at least one of the bit depth or the bit rate for encoding the picture.

3. The method of claim 2, wherein the value of the offset is a non-zero integer.

4. The method of claim 3, wherein the bit depth is 16 bits, and the value of the offset is 2.

5. The method of claim 1, wherein at least one of neighboring positions of the current position is outside of the current transform unit.

6. The method of claim 1, wherein the binary representation of the current position comprises a bypass-coded bin in regular residual coding (RRC).

7. The method of claim 1, wherein converting the quantization level of the current position comprises converting an absolute level of the quantization level of the current position into the binary representation.

8. A method for decoding a picture of a video, the picture comprising a current transform unit, the method comprising:
   decompressing, by a processor, a bitstream to obtain a binary representation of a current position in the current transform unit, and a value of a Rice parameter of the current position for Golomb-Rice binarization, wherein the value of the Rice parameter is determined based on a value of a history variable for a previous transform unit preceding the current transform unit, and the value of the history variable is determined based on at least one of a bit depth or a bit rate for decoding the picture;
   converting, by the processor, the binary representation into a quantization level of the current position using Golomb-Rice binarization with the value of the Rice parameter; and
   dequantizing, by the processor, the quantization level of the current position to generate a coefficient of the current position;
   wherein the value of the history variable is determined based on a value of an offset and a first, non-zero, Golomb-Rice coded quantization level of the quantization levels of the previous transform unit.

9. The method of claim 8, further comprising:
   obtaining the value of the offset based on the at least one of the bit depth or the bit rate for decoding the picture.

10. The method of claim 9, wherein the value of the offset is a non-zero integer.

11. The method of claim 10, wherein the bit depth is 16 bits, and the value of the offset is 2.

12. The method of claim 8, wherein at least one of neighboring positions of the current position is outside of the current transform unit.

13. The method of claim 8, wherein the binary representation of the current position comprises a bypass-coded bin in regular residual coding (RRC).

14. The method of claim 8, wherein converting the binary representation comprises converting the binary representation into an absolute level of the quantization level of the current position.

15. A non-transitory computer-readable storage medium storing a bitstream and a computer program, wherein when executed by a processor, the computer program causes the processor to generate the bitstream by executing a method for encoding a picture of a video, the picture comprising a current transform unit, the method comprising:

quantizing a coefficient of each position in the current transform unit to generate quantization levels of the current transform unit;

determining a value of a Rice parameter of a current position in the current transform unit for Golomb-Rice binarization based on a value of a history variable for a previous transform unit preceding the current transform unit, wherein the value of the history variable is determined based on at least one of a bit depth or a bit rate for encoding the picture;

converting the quantization level of the current position into a binary representation using Golomb-Rice binarization with the value of the Rice parameter; and compressing the binary representation of the current position into the bitstream;

wherein the method further comprises:

determining the value of the history variable based on a value of an offset and a first, non-zero, Golomb-Rice coded quantization level of the quantization levels of the previous transform unit.

16. The non-transitory computer-readable storage medium of claim 15, wherein the method further comprises:

obtaining the value of the offset based on the at least one of the bit depth or the bit rate for encoding the picture.

17. The non-transitory computer-readable storage medium of claim 16, wherein the value of the offset is a non-zero integer.

18. The non-transitory computer-readable storage medium of claim 17, wherein the bit depth is 16 bits, and the value of the offset is 2.

19. The non-transitory computer-readable storage medium of claim 15, wherein at least one of neighboring positions of the current position is outside of the current transform unit.

20. The non-transitory computer-readable storage medium of claim 15, wherein the binary representation of the current position comprises a bypass-coded bin in regular residual coding (RRC).

* * * * *